Oct. 4, 1966 O. KILE 3,276,609
APPARATUS FOR HANDLING PACKS OF PRINTED SIGNATURES
Original Filed March 22, 1962 31 Sheets-Sheet 8
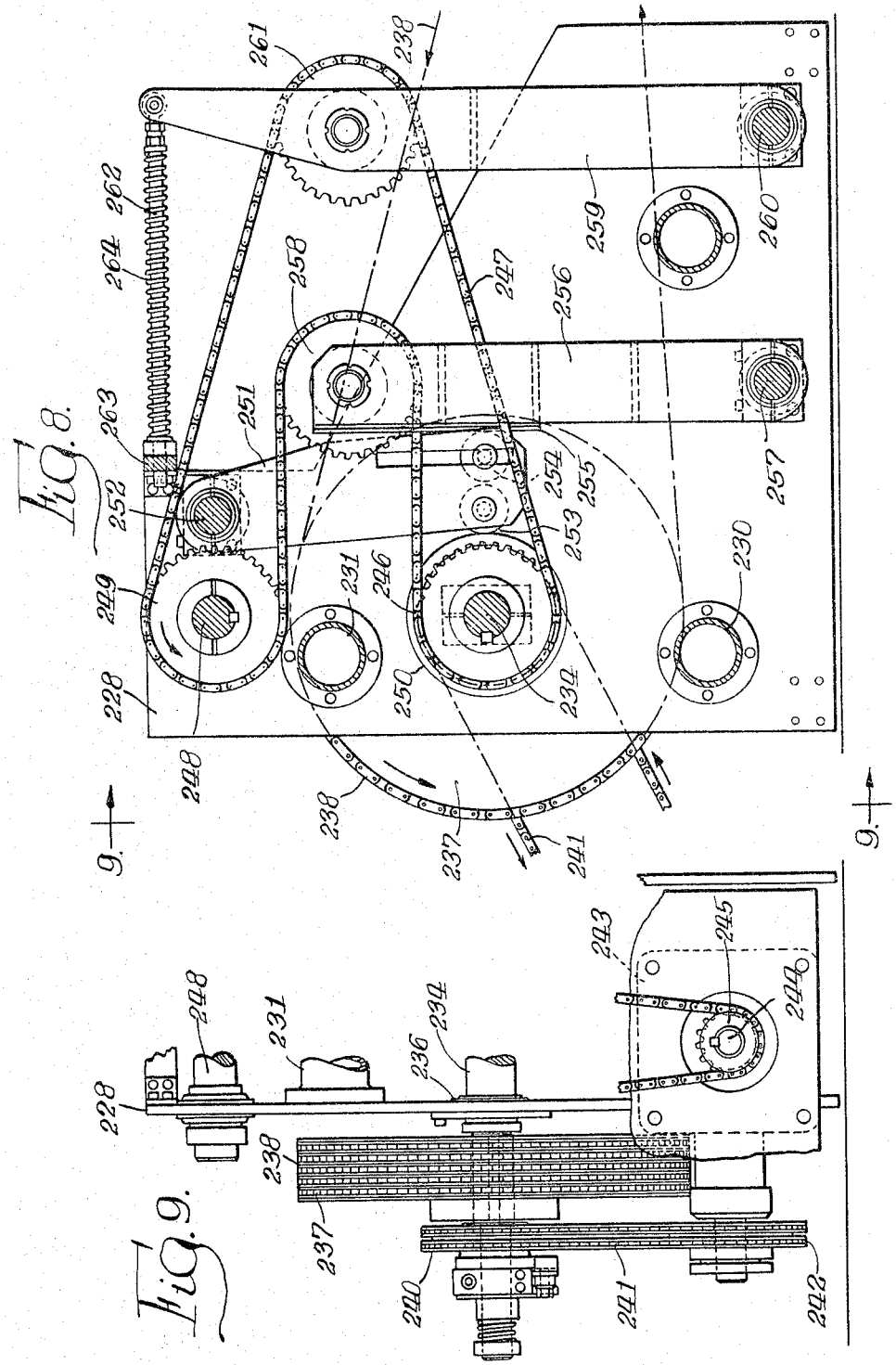

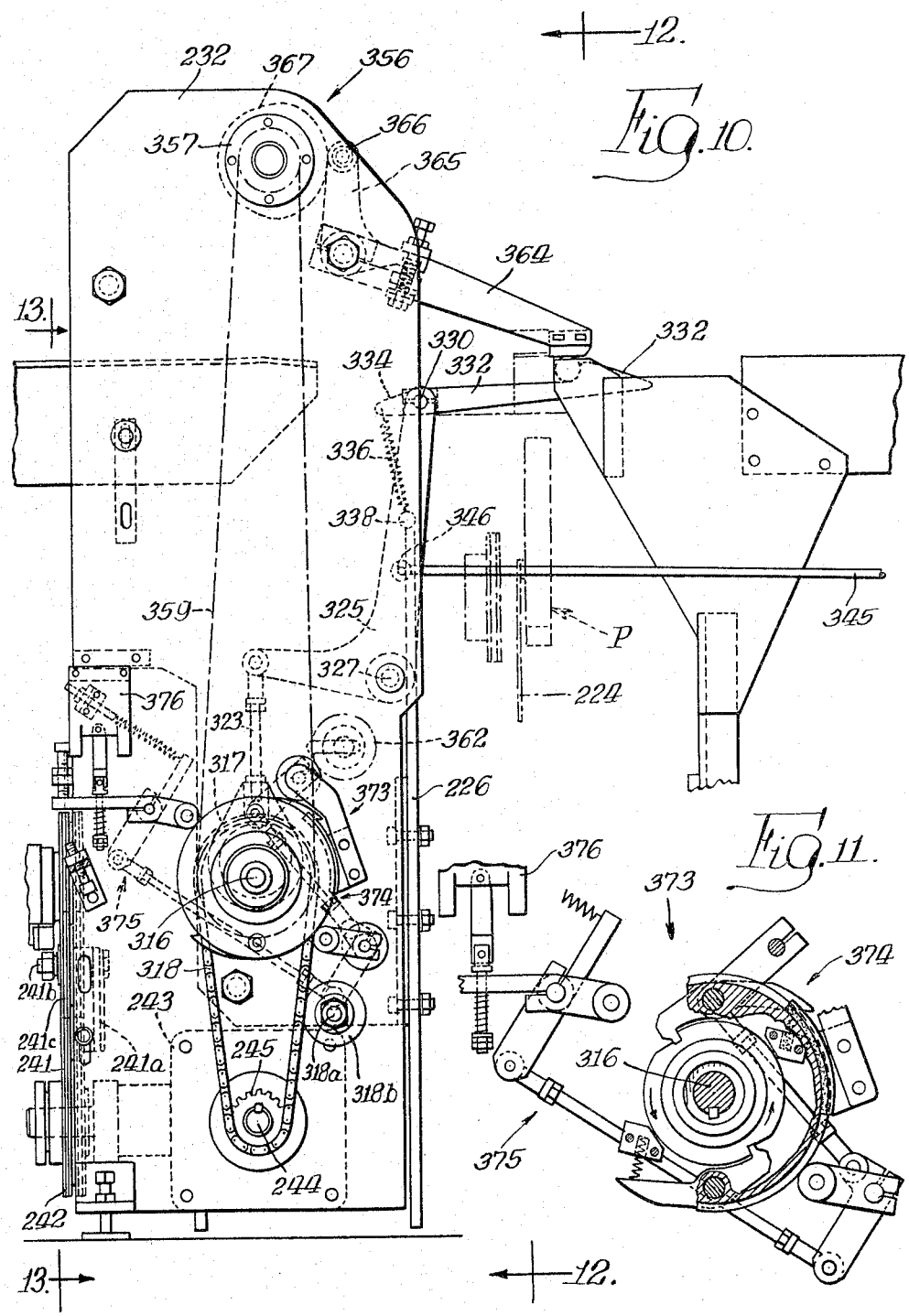

Oct. 4, 1966   O. KILE   3,276,609
APPARATUS FOR HANDLING PACKS OF PRINTED SIGNATURES
Original Filed March 22, 1962   31 Sheets-Sheet 10
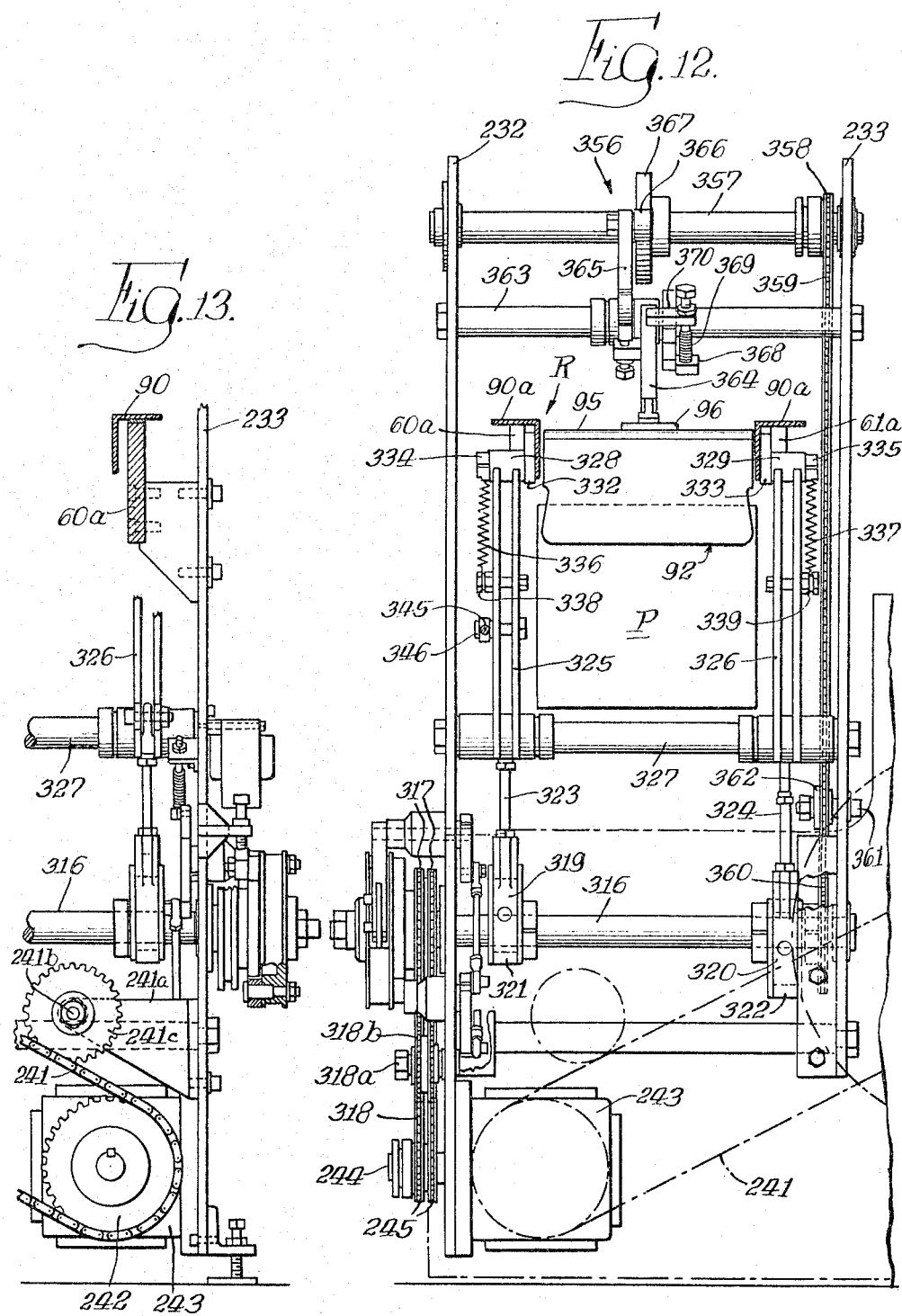

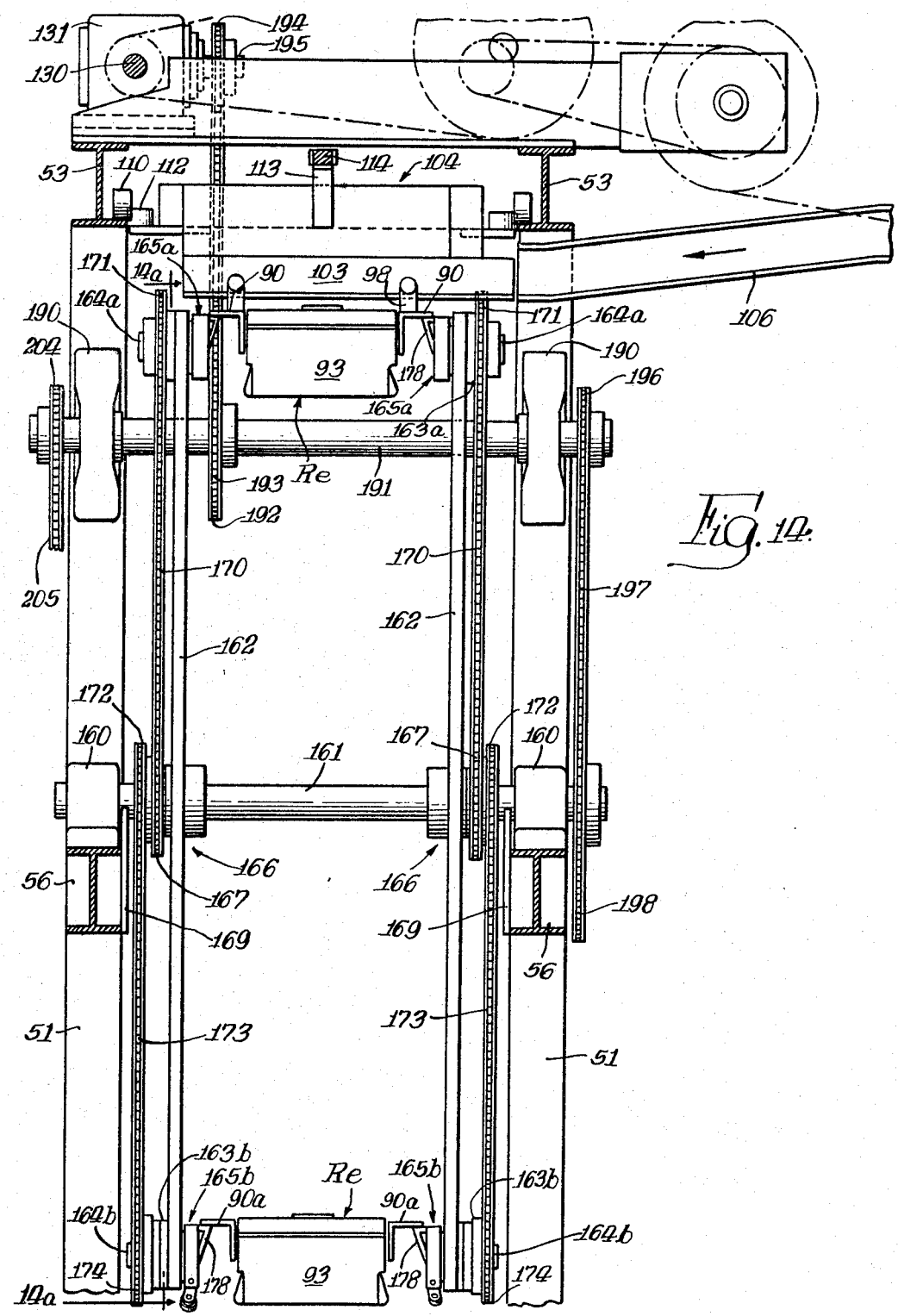

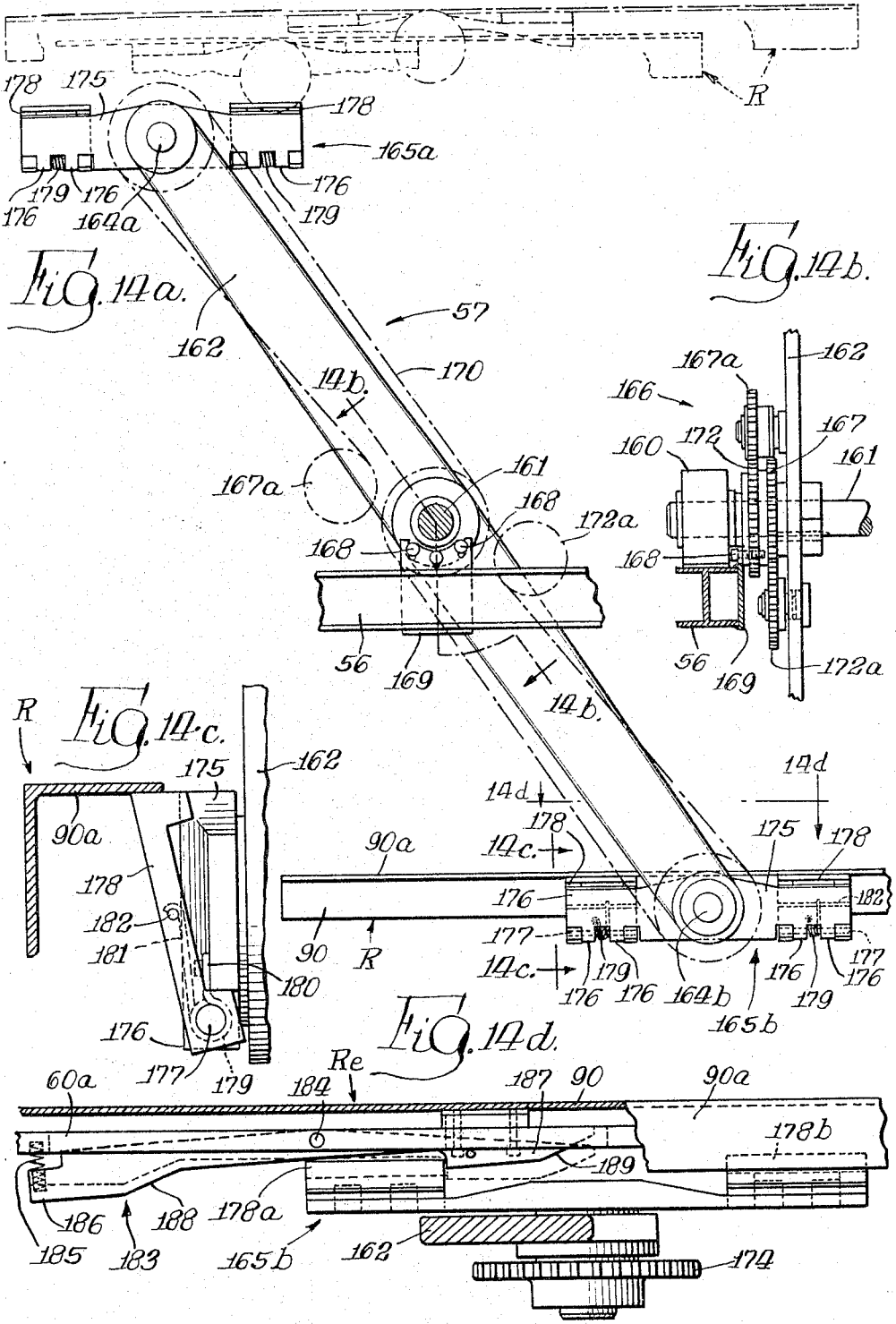

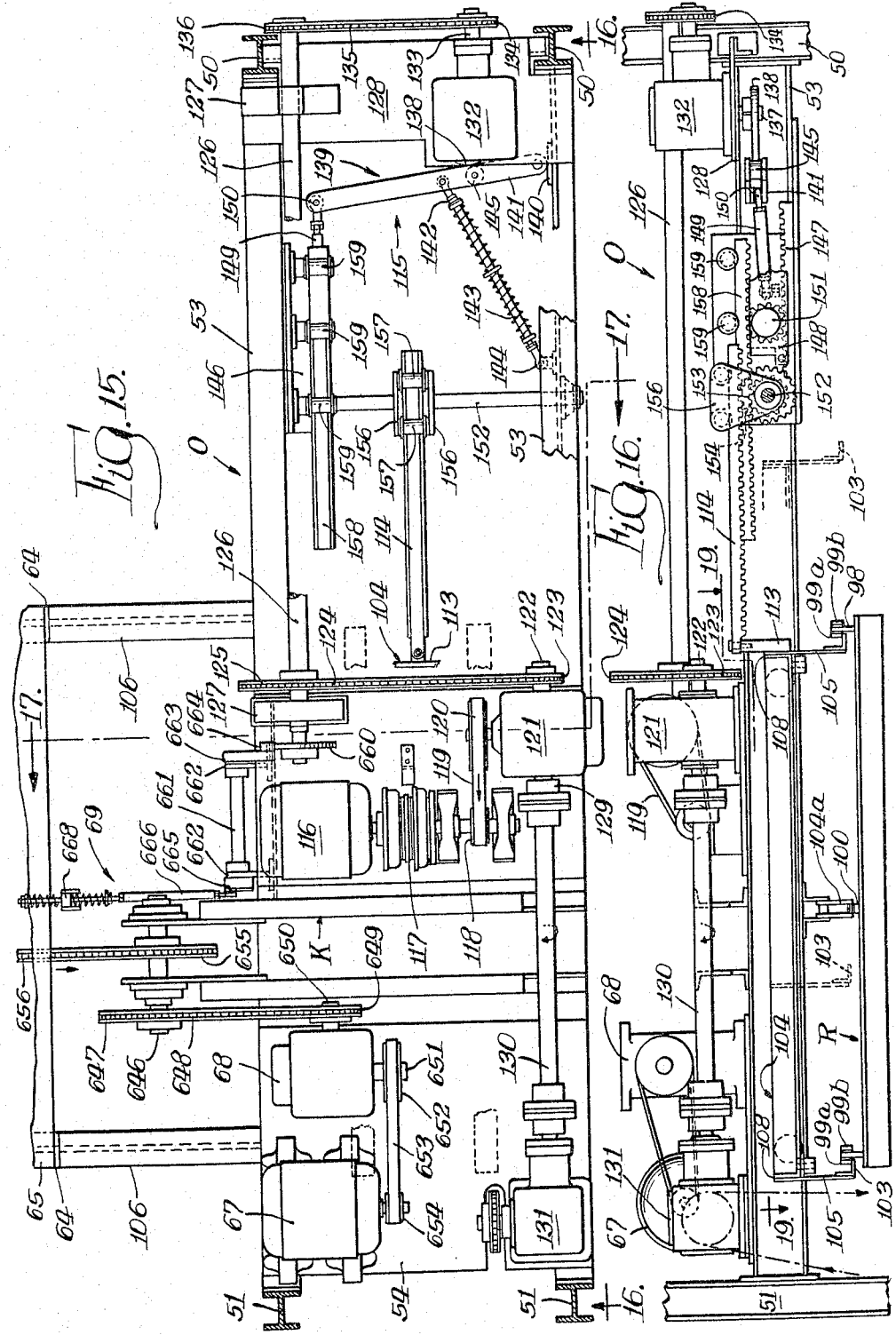

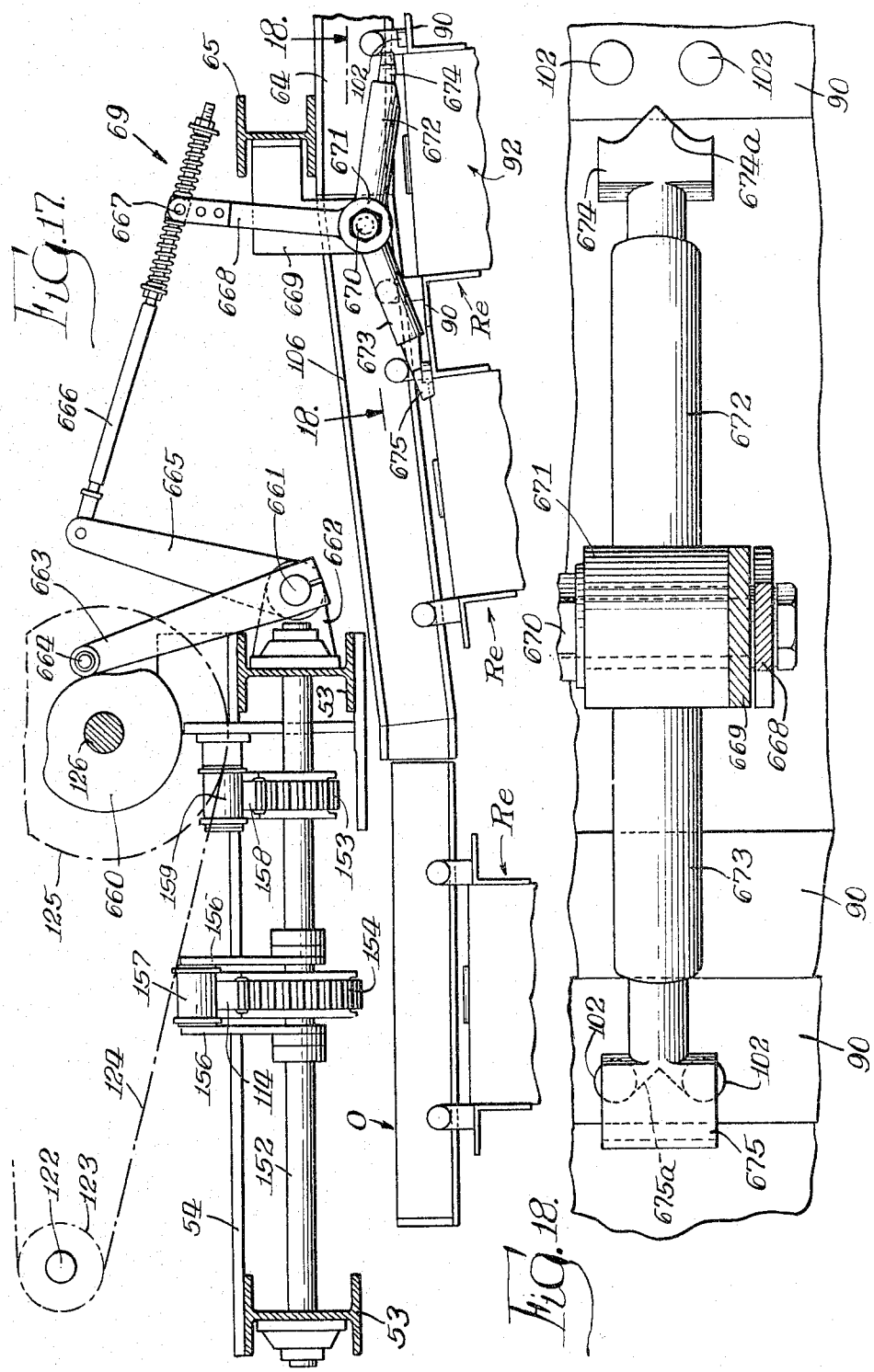

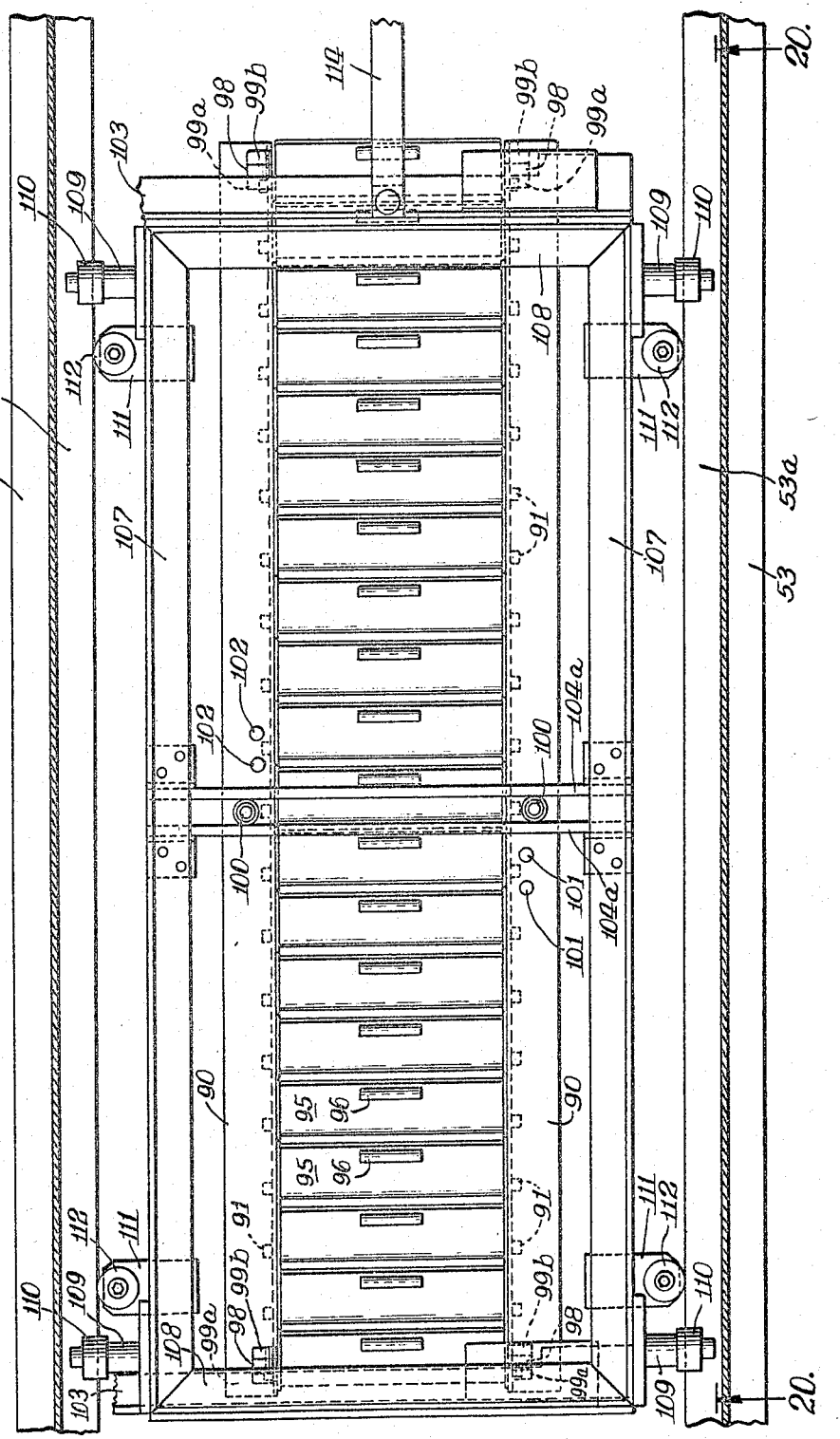

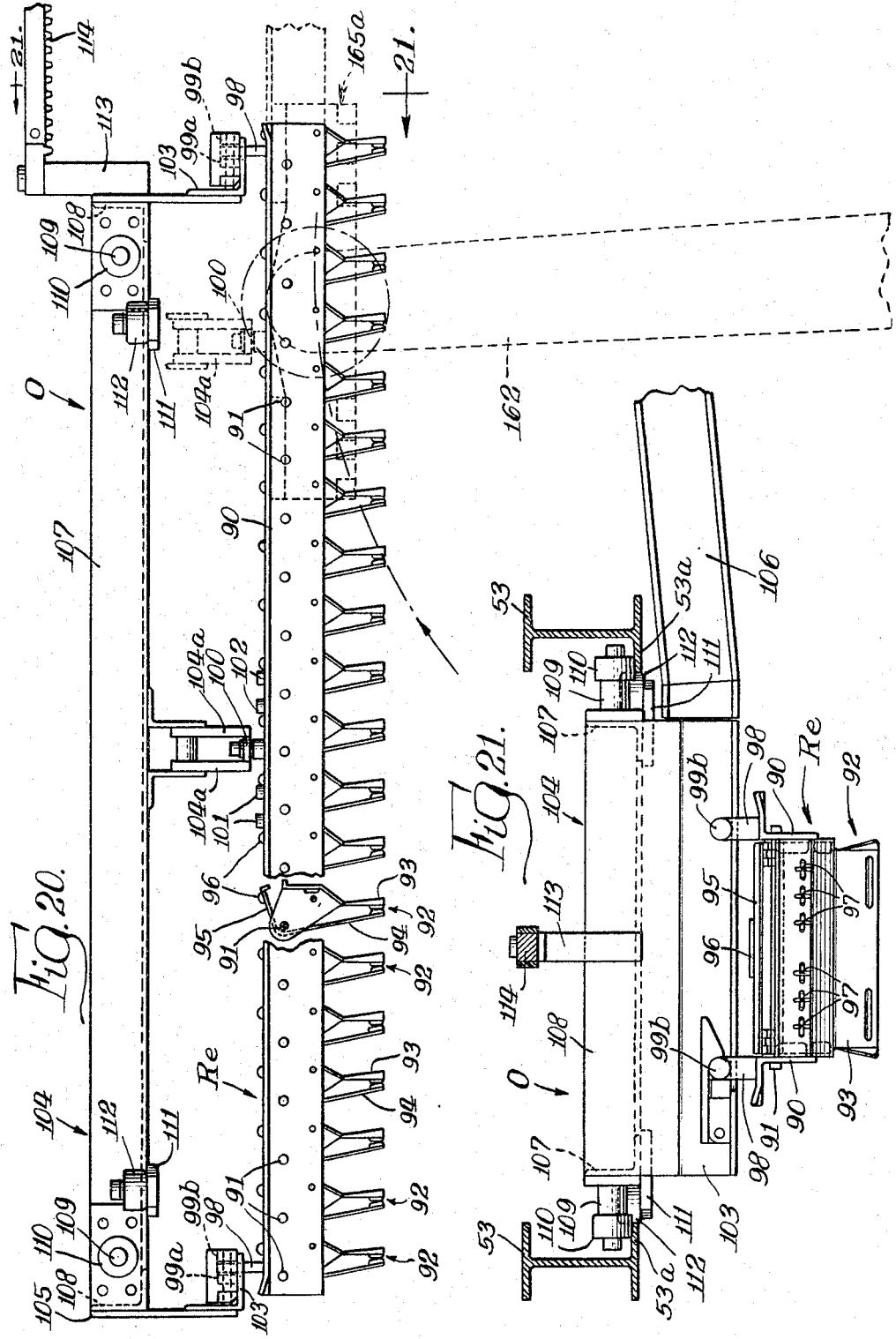

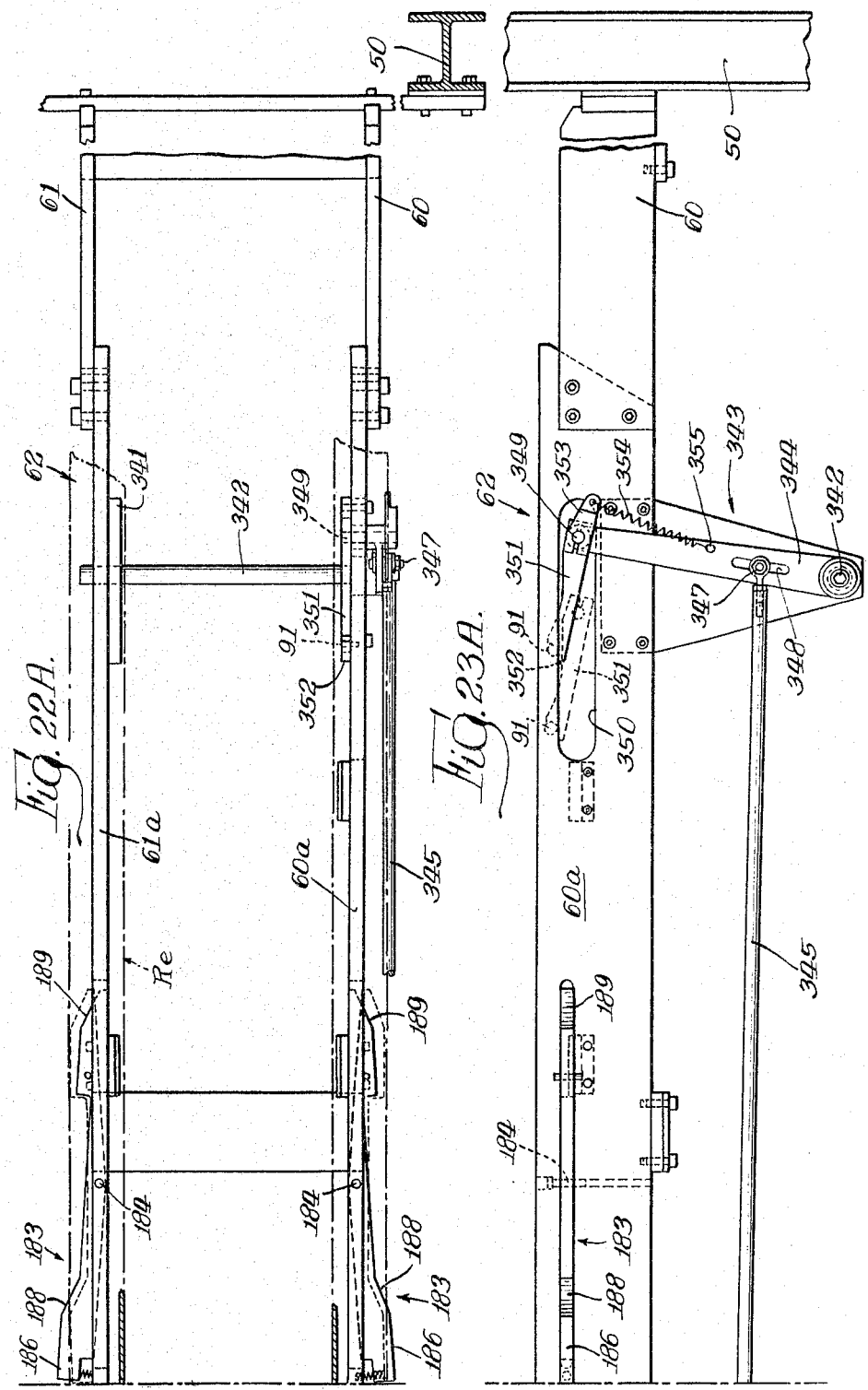

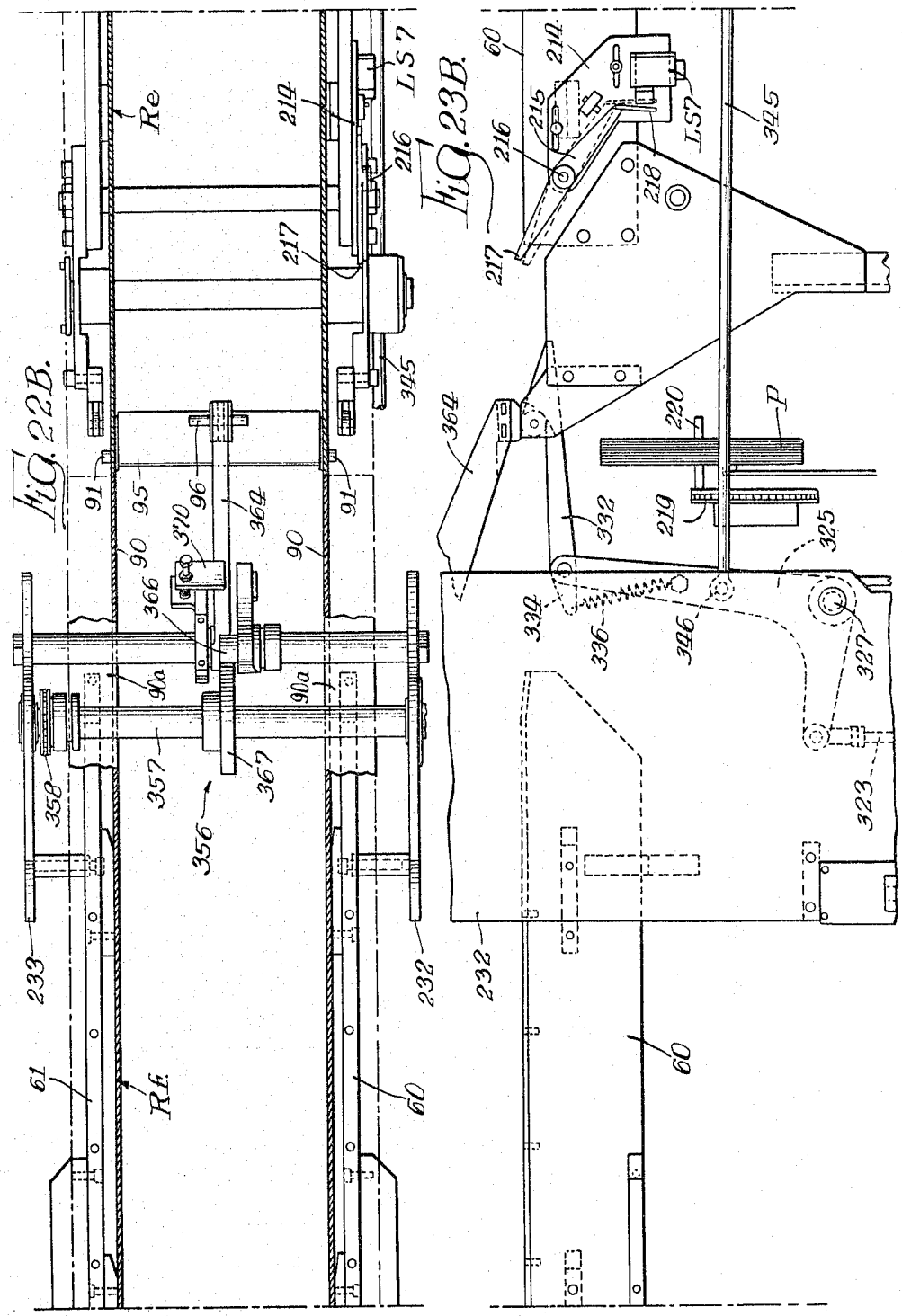

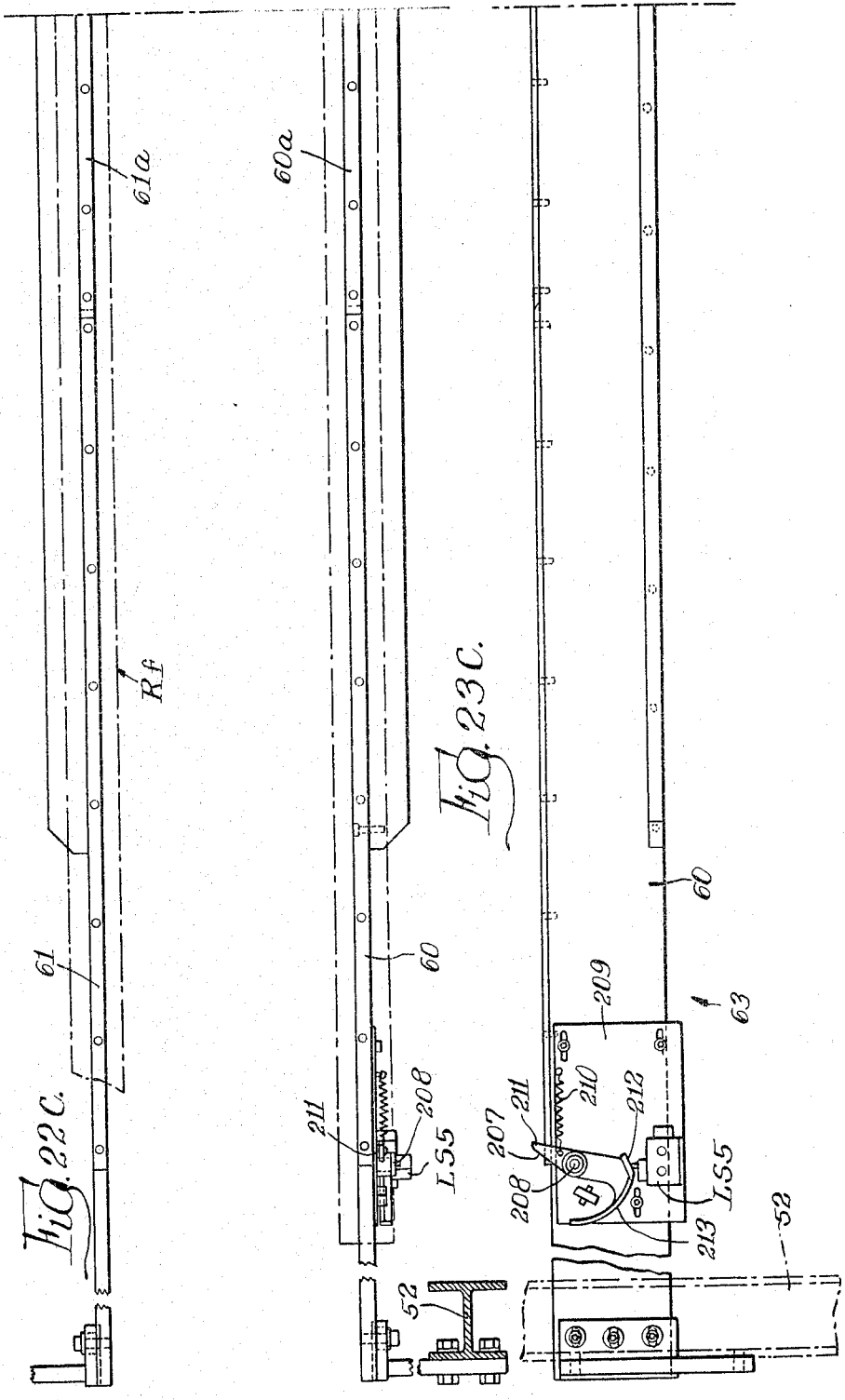

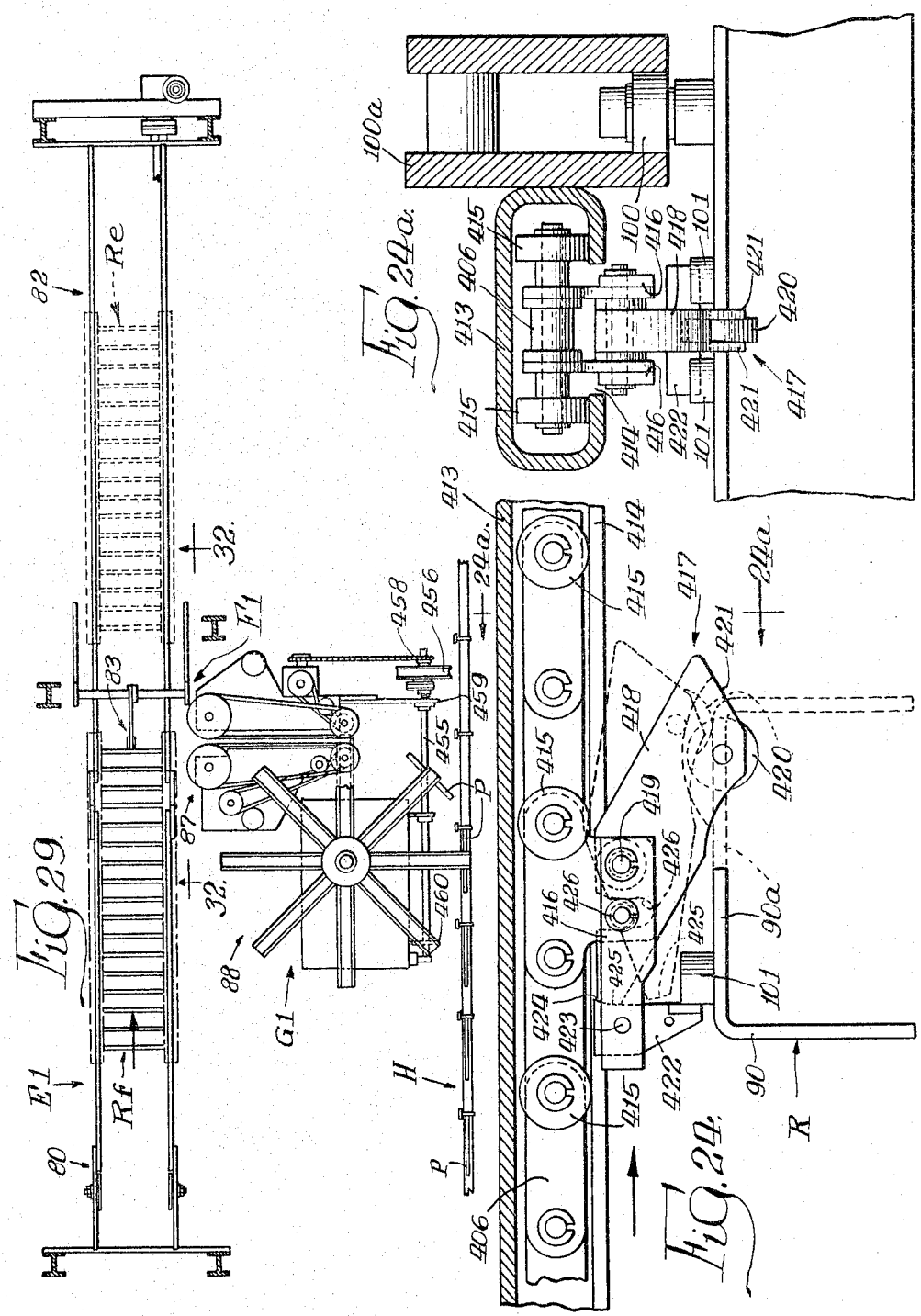

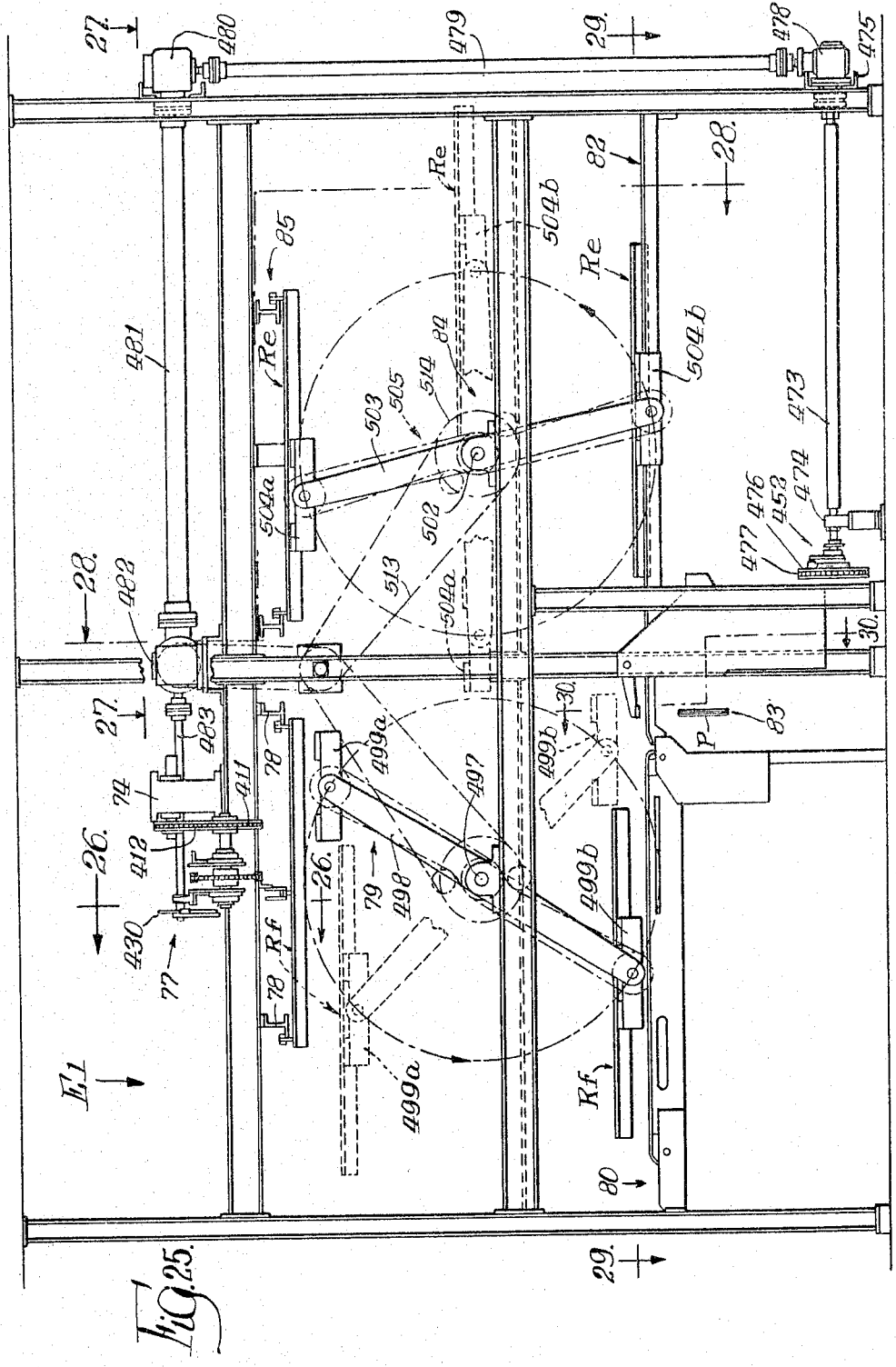

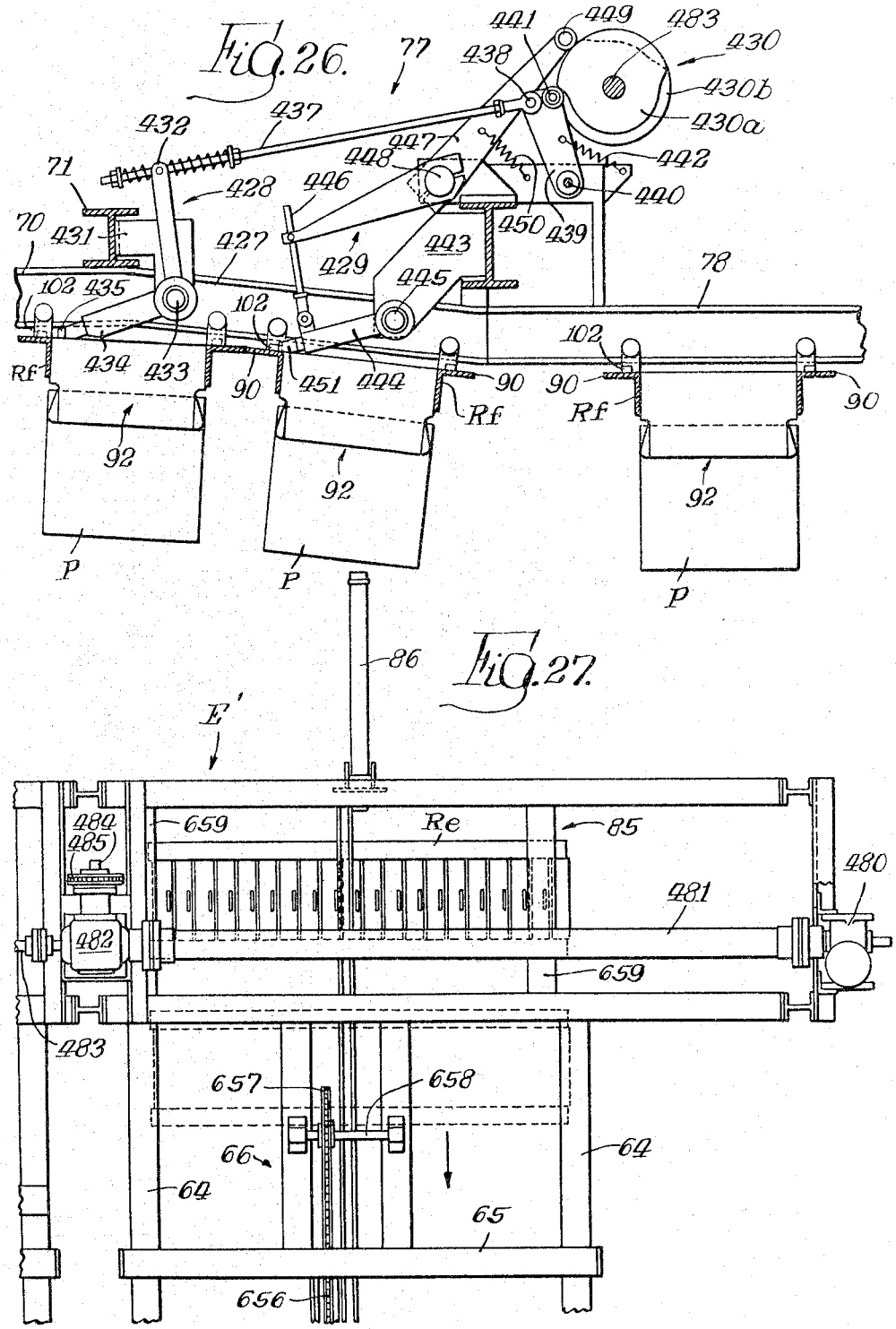

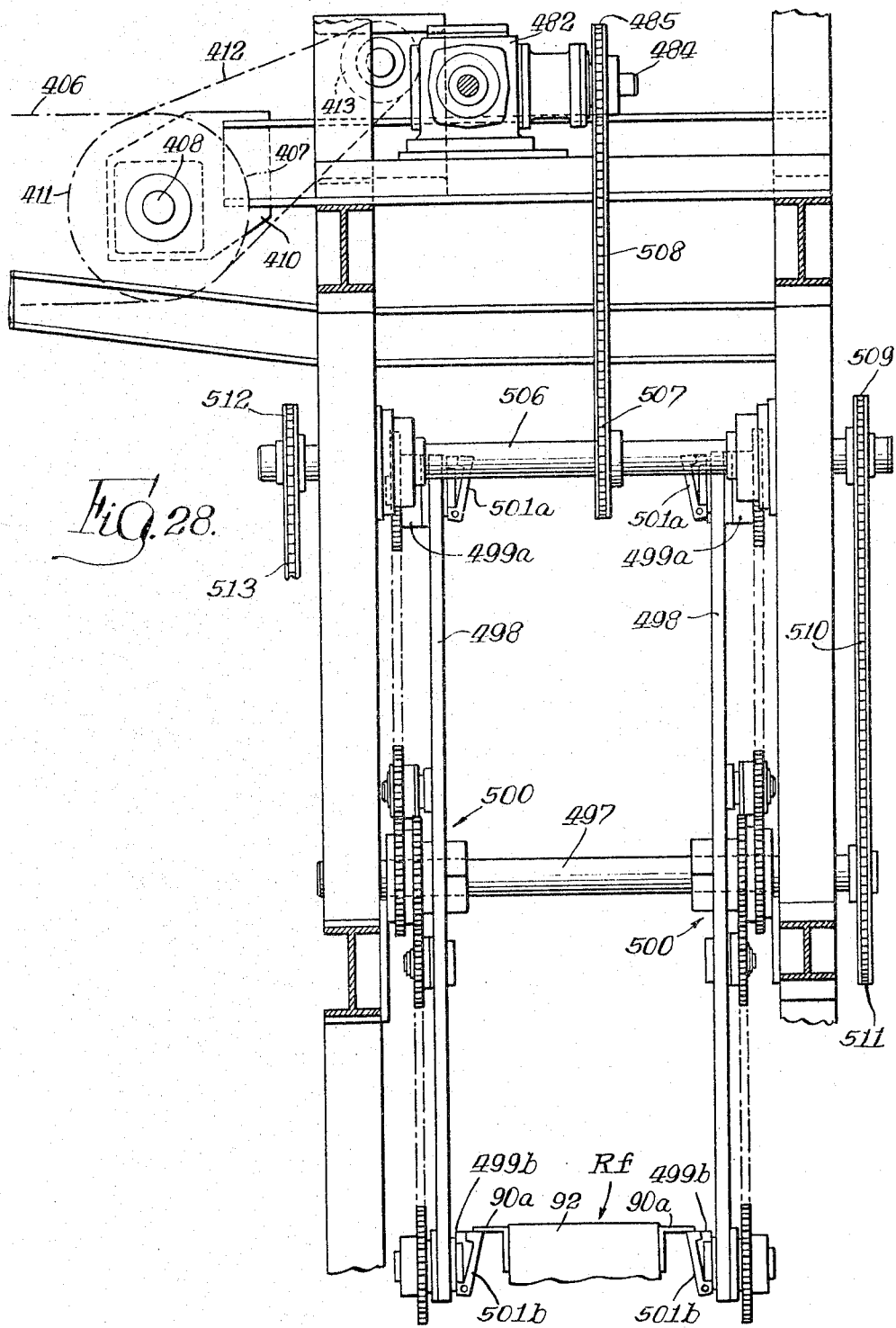

Oct. 4, 1966  O. KILE  3,276,609
APPARATUS FOR HANDLING PACKS OF PRINTED SIGNATURES
Original Filed March 22, 1962  31 Sheets-Sheet 24
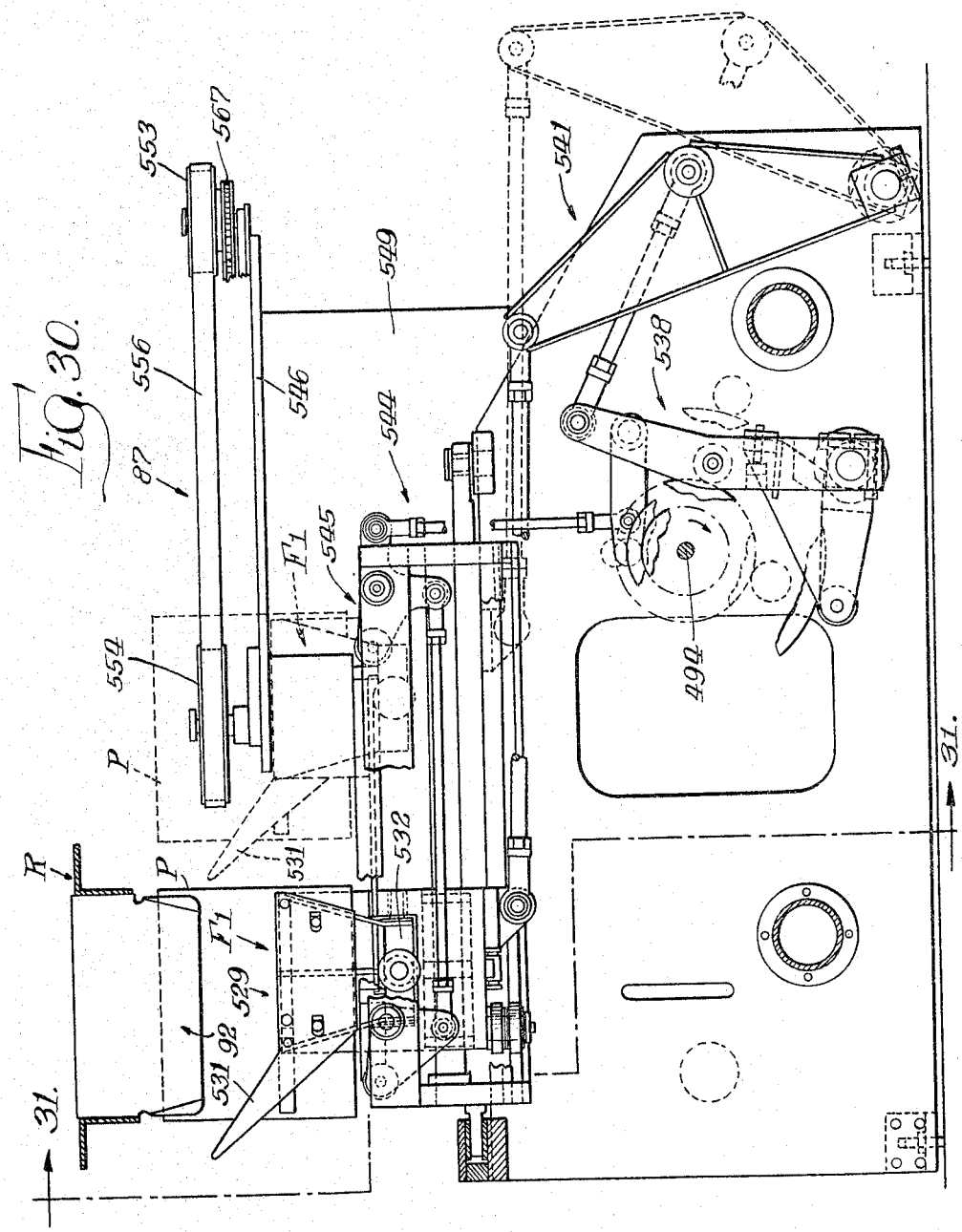

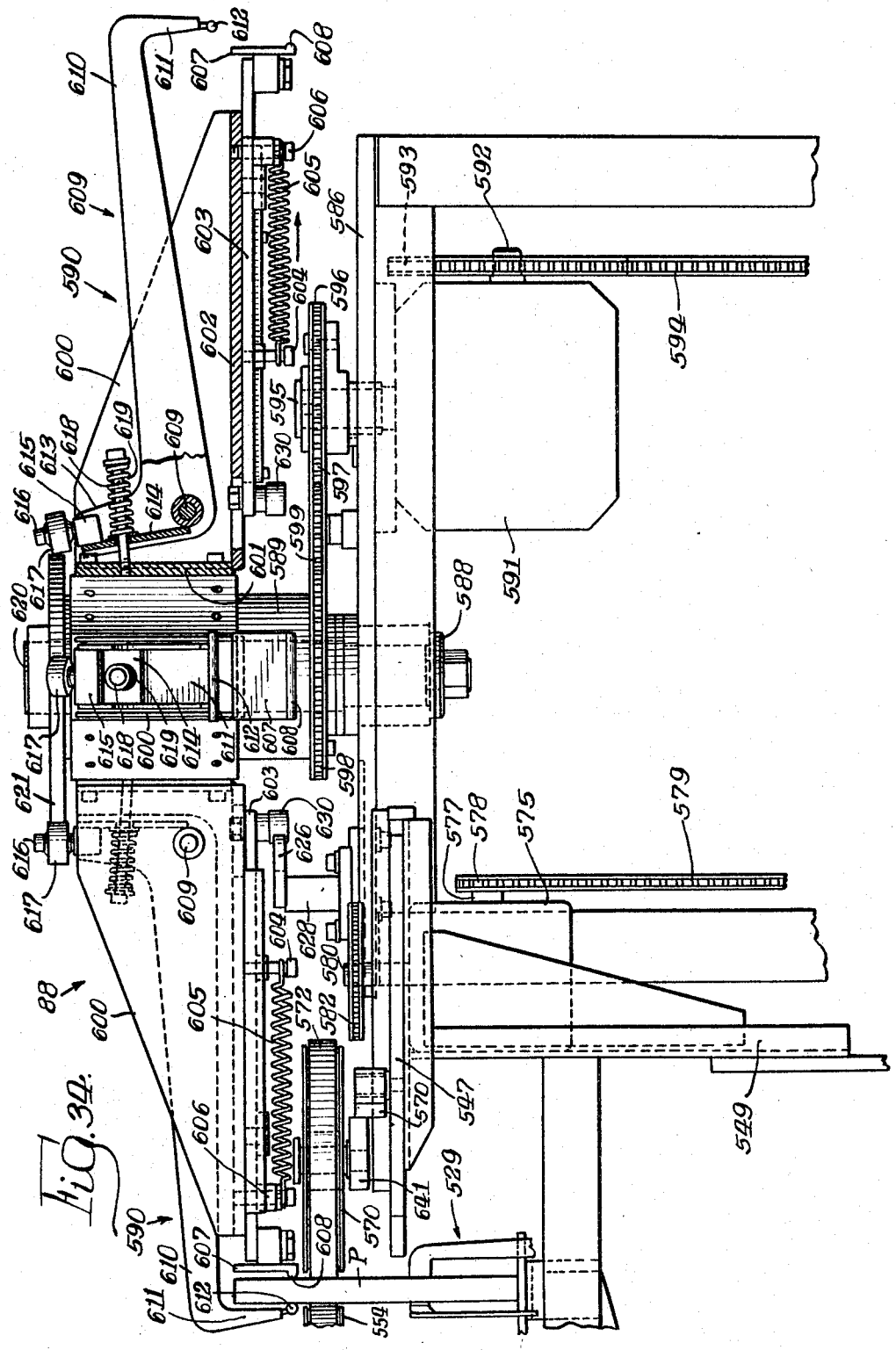

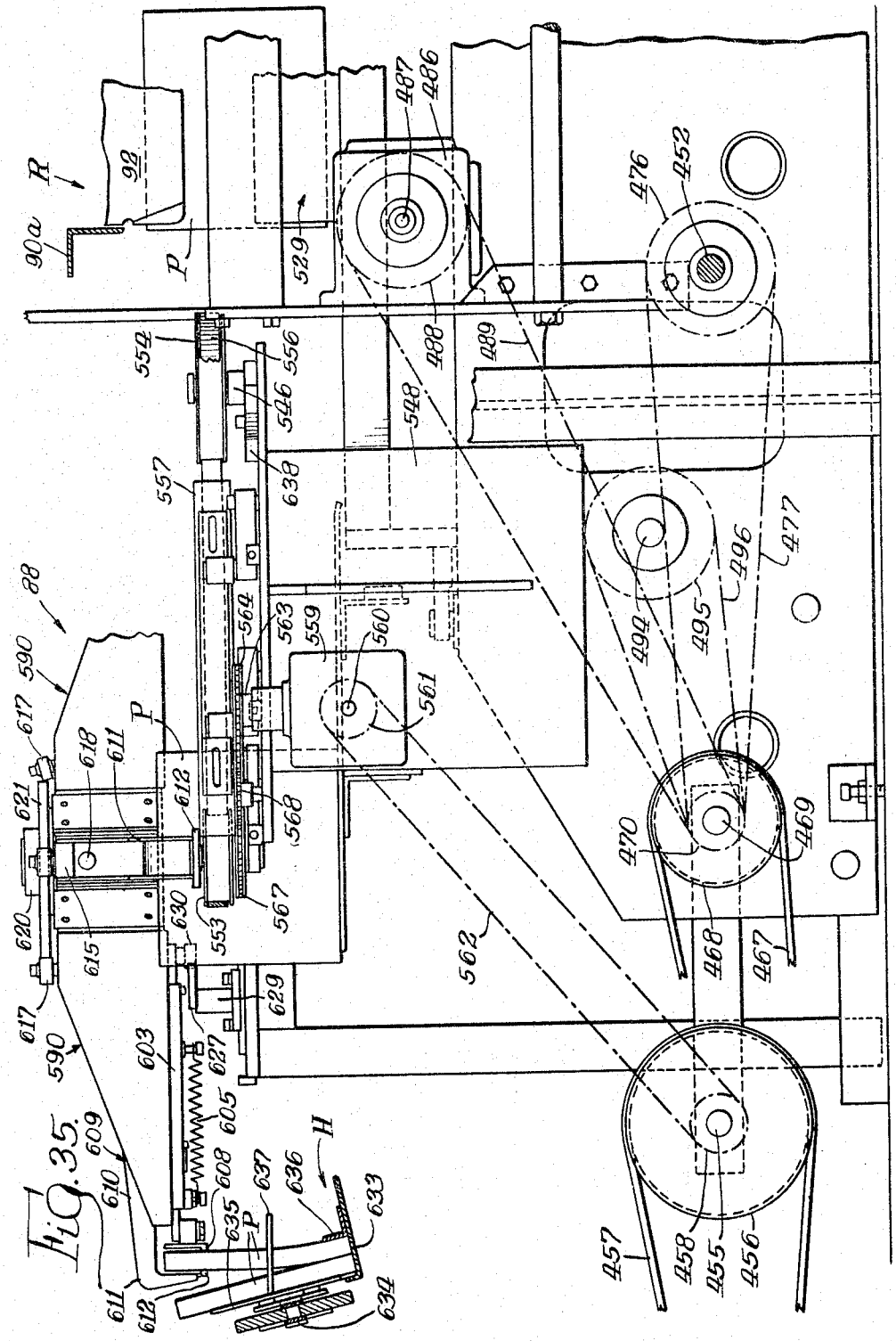

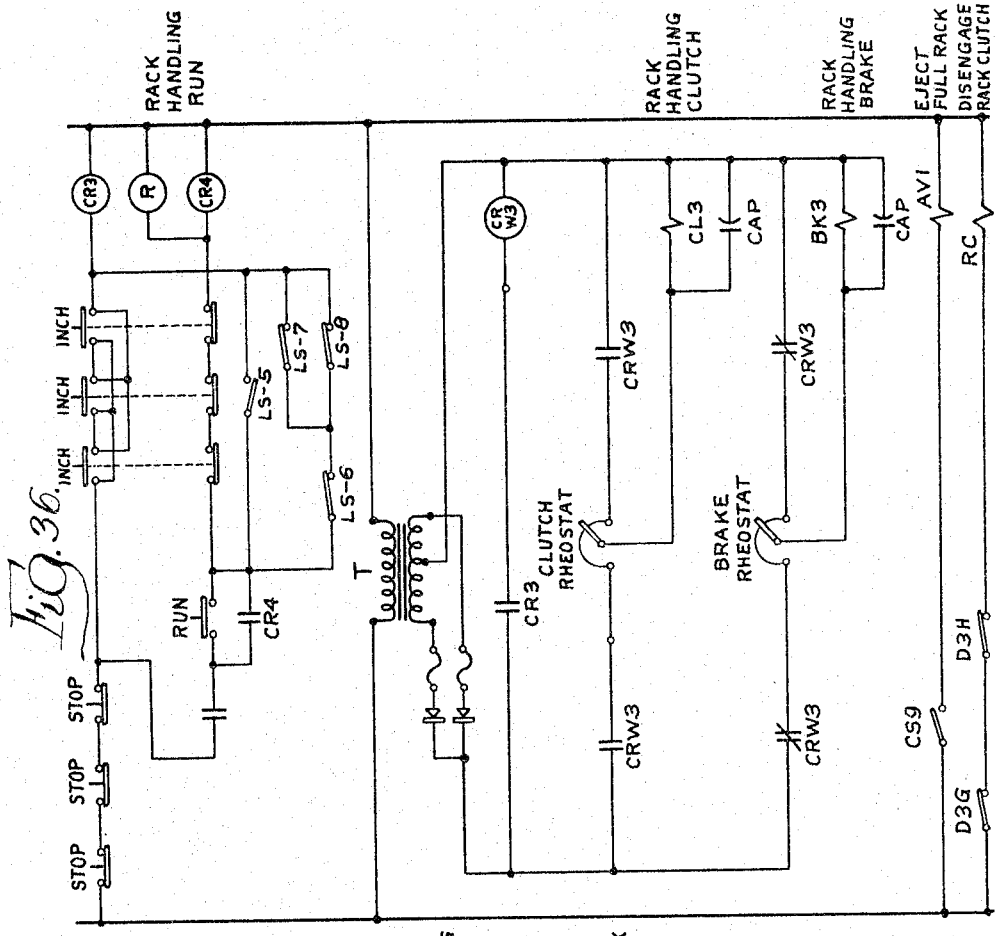
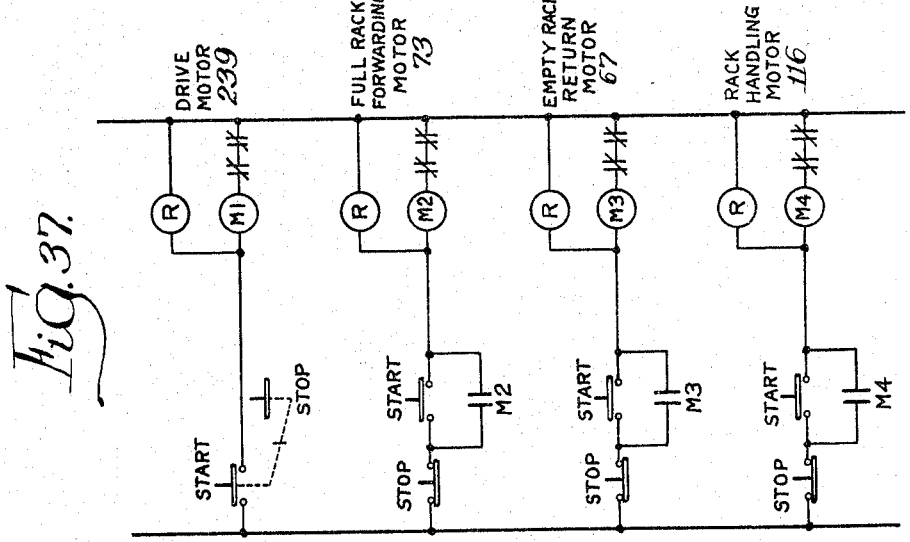

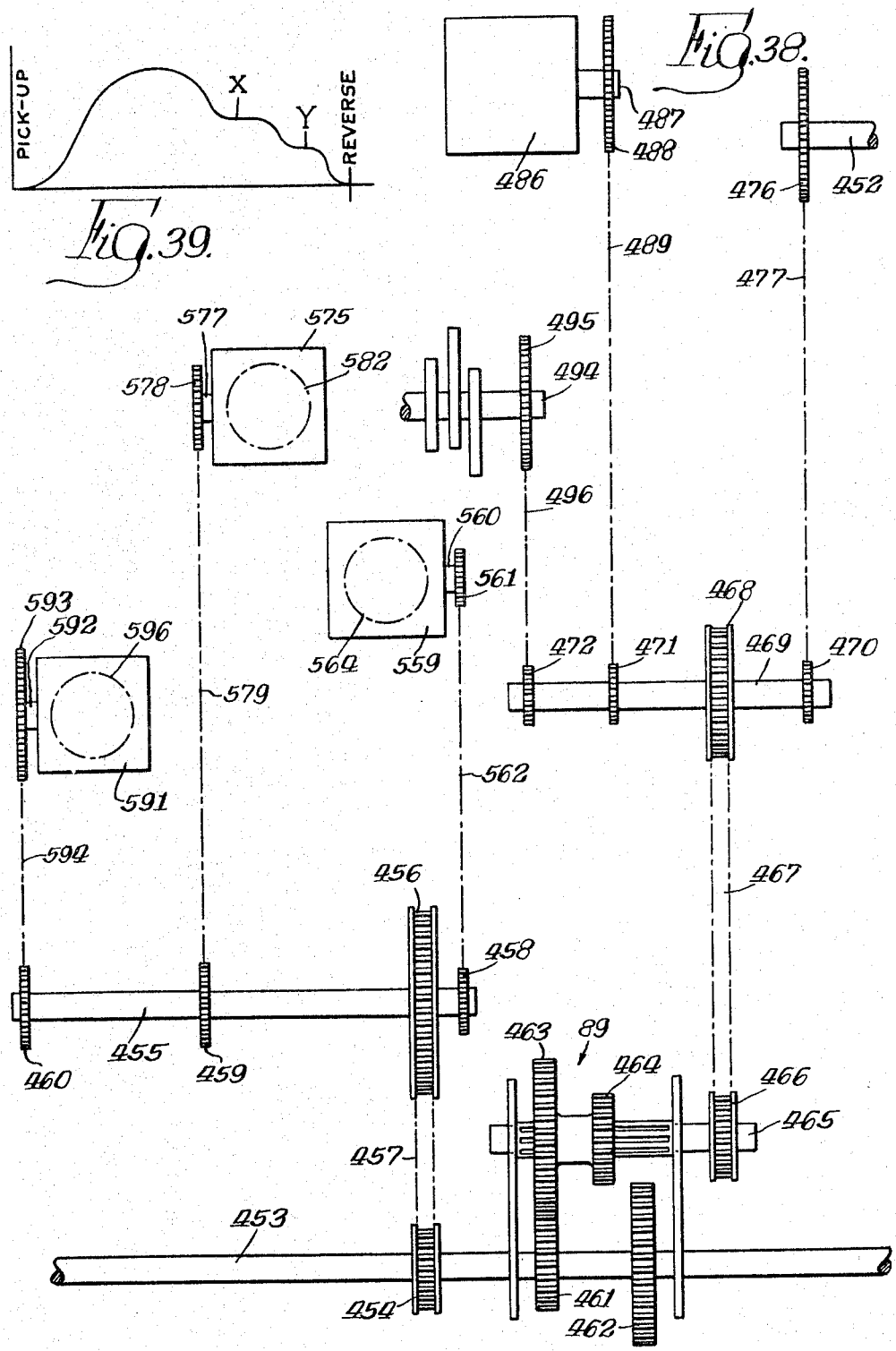

United States Patent Office 3,276,609
Patented Oct. 4, 1966

1

3,276,609
APPARATUS FOR HANDLING PACKS OF
PRINTED SIGNATURES
Otho Kile, Homewood, Ill., assignor to R. R. Donnelley &
Sons Company, a corporation of Delaware
Original application Mar. 22, 1962, Ser. No. 181,754, now
Patent No. 3,206,043, dated Sept. 14, 1965. Divided
and this application May 14, 1965, Ser. No. 455,692
19 Claims. (Cl. 214—16)

This invention relates to an apparatus for and method of handling packs of printed signatures, and in particular it relates to apparatus which receives signatures from a signature gathering machine and loads them into racks for storage and transfer to an unloading apparatus. The present application is a division of my copending application Serial No. 181,754, filed March 22, 1962, which issued September 14, 1965 as Patent No. 3,206,043.

A very serious problem in the publication of large catalogs such as those of the major mail order houses is caused by the large number of signatures which must be gathered and bound to form such catalog. A typical mail order catalog may require upwards of a hundred signatures; and the entire problem of gathering and binding the signatures is complicated by the fact that in a large mail order house each department commonly has its own catalog budget and provides the material for its own section of the catalog, so that the material which makes up a single catalog is originally in many different sized groups with colored sheets which must be scattered through parts of the catalog devoted to the various departments.

It is not practical to take groups of gathered signatures and store them in any ordinary fashion, because substantially perfect registration between signatures in a group must be maintained from the time they are gathered until the time they are bound; and no ordinary storage facilities assure the maintenance of such registration. One technique which has sometimes been used is to pregather a group of signatures and temporarily side-stitch them so that they may be stored until they are to be incorporated into the catalog. The principal difficulty with this system is that the stitching must be trimmed off before the signatures go to the patent binder.

On the other hand, if the system of pre-gathering groups of signatures is not used, and the equipment is set up to gather and bind an entire mail order catalog at one time, an enormously long gathering unit is required, containing anywhere from 90 to 132 boxes, most of which are used only twice a year when the large catalogs are bound.

Another major factor in attempting to gather an entire mail order catalog at one time is that any failure of a single box in the gathering unit will produce a defective catalog, and accordingly, the break-down of any one of the large number of boxes in the gathering unit requires a shut-down of the entire line. Operation of a single gatherer is particularly undesirable because the binder operates about twice as fast as the gatherer, and the use of the binder is at a very low level of efficiency.

In accordance with the present invention, two or three separate gathering machines may be used in the binding of a single large catalog, with two gatherers each handling 48 signatures and the third handling 36, to make a total of 132 signatures. If the catalog requires only 96 signatures only the first two gatherers are used. Each gatherer has its own storage section, to hold a predetermined number of gathered signatures, and operates independently of the other two gatherers. The storage section associated with each of the three gatherers provides a floating pool of packs of signatures, each pack being a partial catalog, and the packs are withdrawn from the storage pools at the speed of operation of the binder, with packs from all

2 three pools being moved into the binder together to be bound as a unit. Each storage section has a plurality of racks for storing packs of signatures side-by-side, and each pack of signatures is held in clamping jaws which maintain the necessary registration between signatures of the pack throughout the process of storage and delivery of the packs to the binder.

Establishment of pools of packs of signatures from each of the two or three gatherers assures that the binder may operate at top speed once the gatherers have been operated long enough to establish a backlog in the storage pools. It also assures that a temporary breakdown of one gatherer will not necessitate shutting down the other gatherers or the binder.

Since each storage pool has a capacity considerably larger than is usually required, it also permits continuing operation of the gatherers in the event the binder is shut down for any reason.

Furthermore, the present invention permits great flexibility in use of equipment, because the relatively short gatherers are entirely practical to use for the smaller, seasonal catalogs which are published between the semi-annual publications of the large catalogs. Thus, for example, when a small seasonal catalog is being gathered and bound the two 48 box gatherers may both be used; but where the signatures are fed from the storage racks into the conveyor which transports them to the binder the feed is modified so that the packs of signatures from the two gatherers go into the conveyor one behind the other with each pack of signatures forming a complete catalog. It is apparent that in this type of operation both gatherers are handling signatures which are identical and the packs of signatures are identical coming from the two gatherers. Conversely, in the case of the large semi-annual catalogs, the signatures gathered by the two or three gatherers, and consequently the packs of signatures issuing from the two or three gatherers, are all different.

The principal object of the invention, therefore, is to provide an improved apparatus for and method of handling packs of printed signatures between the gatherers and the binder.

Another object of the invention is to provide an apparatus which will permit more efficient use of available floor space, more efficient use of the gatherers, and more efficient use of the binder.

Still another object of the invention is to provide apparatus which may be operated to carry out either one of two alternative methods, thereby providing a degree of flexibility not heretofore obtainable.

The invention is illustrated in a preferred embodiment in the accompanying drawings in which:

FIG. 1 is a diagrammatic plan view illustrating the general arrangement of the three gatherers, the storage pools for the three gatherers, loading stations at which packs of signatures from the gatherers are loaded into empty storage racks, unloading stations at which the packs of signatures are removed from the storage racks, the pack unloading and feeder mechanism at the unloading station, and the conveyor which delivers the packs of signatures seriatim from the feeder mechanism to the binder;

FIG. 2 is a diagrammatic perspective view of a single unit showing diagrammatically, or schematically the infeed for packs of signatures, the loading station, the unloading station, the empty rack return mechanism which stores and continuously returns empty racks to the loading station, the full rack forwarding mechanism which stores and continuously forwards full racks to the unloading station, the pack unloading and feeder mechanism, and the conveyor mechanism for delivering the packs of signatures seriatim from the feeder mechanism to the binder;

FIG. 8 is a fragmentary section taken substantially as illustrated along the line 8—8 of FIG. 6;

FIG. 9 is a fragmentary section taken substantially as illustrated along the line 9—9 of FIG. 7 or of FIG. 8;

FIG. 10 is a fragmentary section taken substantially as illustrated along the line 10—10 of FIG. 5, illustrating the mechanism for advancing storage and transfer racks through the loading station;

FIG. 11 is a fragmentary view, partially in section, which is an enlargement of parts of the mechanism seen in FIG. 10;

FIG. 12 is a fragmentary section taken substantially as illustrated along the line 12—12 of FIG. 10;

FIG. 13 is a fragmentary section taken substantially as illustrated along the line 13—13 of FIG. 10;

FIG. 14 is a fragmentary section taken substantially as illustrated along the line 14—14 of FIG. 4, illustrating the rotary arms which move empty racks from the storage and return means to the infeed end of the loading station;

FIG. 14a is a fragmentary section taken substantially as illustrated along the line 14a—14a of FIG. 14, said section being somewhat schematic in order to illustrate the pick-up of a rack by the arms;

FIG. 14b is a fragmentary section taken substantially as illustrated along the line 14b—14b of FIG. 14a;

FIG. 14c is a fragmentary section on an enlarged scale, taken substantially as illustrated along the line 14c—14c of FIG. 14a;

FIG. 14d is a fragmentary section on an enlarged scale, taken substantially as illustrated along the line 14d—14d of FIG. 14a;

FIG. 15 is a fragmentary plan view taken substantially as illustrated along the line 15—15 of FIG. 4, illustrating the empty rack positioning apparatus which moves an empty rack from the end of the storage and return means into a position to be engaged by the rotary rack carrying arms;

FIG. 16 is a fragmentary front elevational view taken substantially as illustrated along the line 16—16 of FIG. 15;

FIG. 17 is a fragmentary section taken substantially as illustrated along the line 17—17 of FIG. 15, illustrating the escapement mechanism for permitting one rack at a time to leave the storage and return means and enter the rack positioning mechanism;

FIG. 18 is a fragmentary plan view taken substantially as illustrated along the line 18—18 of FIG. 17;

FIG. 19 is a plan view of a single storage and transfer rack located in the rack positioning mechanism, preparatory to being picked up by the rotary arms for lowering into the loading station;

FIG. 20 is a fragmentary section taken substantially as illustrated along the line 20—20 of FIG. 19;

FIG. 21 is a fragmentary section taken substantially as illustrated along the line 21—21 of FIG. 20;

FIGS. 22a, 22b and 22c are related sectional views on an enlarged scale taken substantially as illustrated along the line 22—22 of FIG. 4, FIG. 22a being at the right of FIG. 4, FIG. 22b in the center, and FIG. 22c at the left;

FIGS. 23a, 23b and 23c are related front elevational views of the apparatus seen in FIGS. 22a, 22b and 22c;

FIG. 24 is a fragmentary section on an enlarged scale, taken substantially as illustrated along the line 24—24 of FIG. 3, a side frame member of one signature storage rack being shown in solid lines, and an adjacent rack in broken lines, illustrating the construction of power and free conveyor 72 and its cooperation with the racks.

FIG. 24a is a section taken substantially as illustrated along the line 24a—24a of FIG. 24, with the rack R omitted for clarity;

FIG. 25 is an elevational view of the unloading station, viewed from beneath the storage means, and with the unloading mechanism and the pack conveyor feeder omitted for clarity of illustration;

FIG. 26 is a fragmentary section on an enlarged scale taken substantially as illustrated along the line 26—26 of FIG. 25, illustrating the rack forwarding escapement mechanism;

FIG. 27 is a fragmentary plan view taken substantially as illustrated along the line 27—27 of FIG. 25;

FIG. 28 is a fragmentary section on an enlarged scale taken substantially as illustrated along the line 28—28 of FIG. 25;

FIG. 29 is a sectional view on a reduced scale taken substantially as illustrated along the line 29—29 of FIG. 25;

FIG. 30 is a fragmentary section on an enlarged scale taken substantially as illustrated along the line 30—30 of FIG. 25;

FIG. 34 is a fragmentary section on an enlarged scale taken substantially as illustrated along the line 34—34 of FIG. 33, with parts omitted for clarity;

FIG. 35 is a fragmentary section taken substantially as illustrated along the line 35—35 of FIG. 33;

FIG. 36 is a wiring diagram of the electrical controls for the rack lowering and elevating arms of the loading station and related parts;

FIG. 37 is a wiring diagram of the drive motor controls;

FIG. 38 is a diagrammatic showing of the power transmission system at the unloading end; and FIG. 39 is a speed curve of the unloading means.

*General description of apparatus and system*

Figure 1:
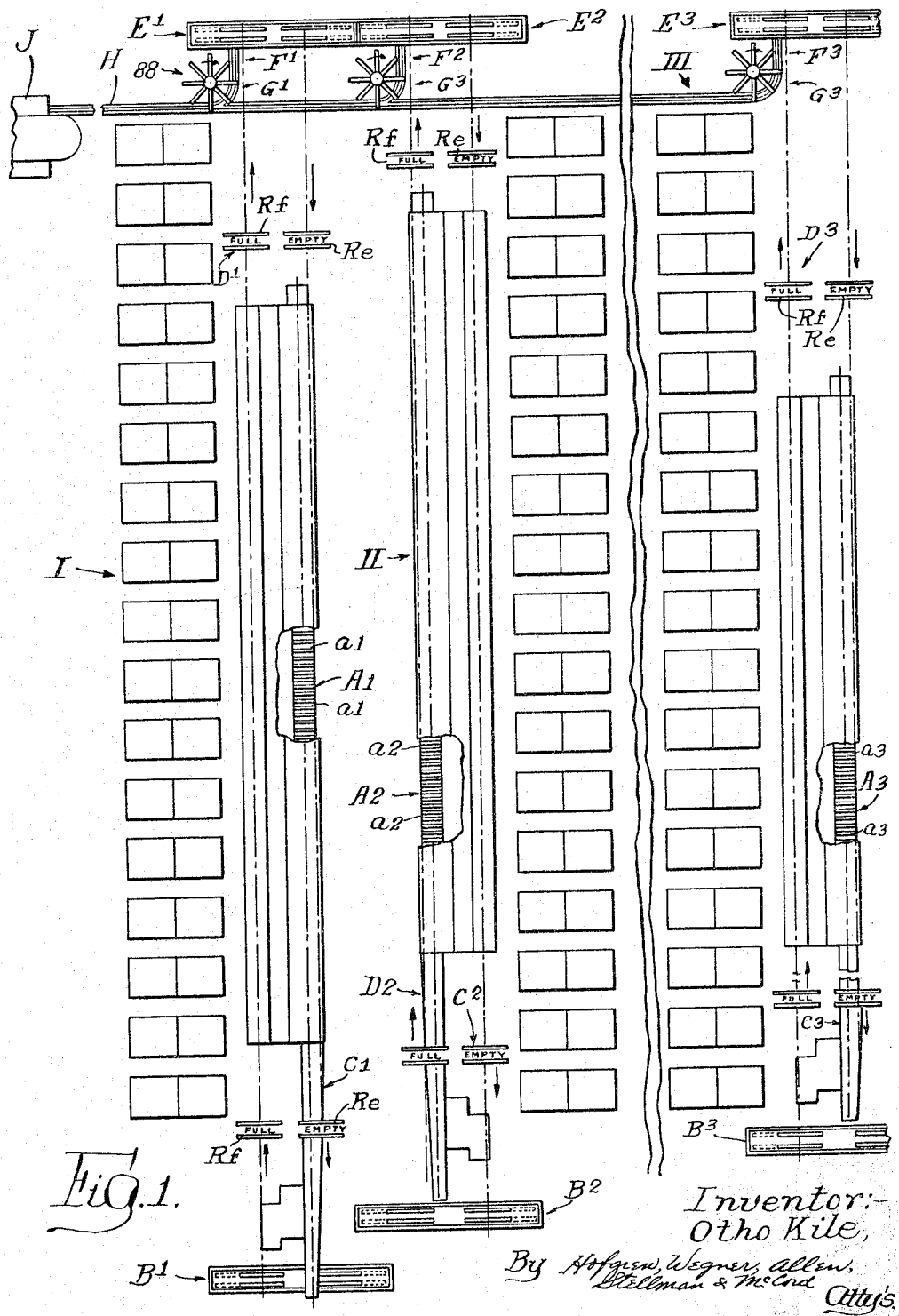

Referring first to FIG. 1 of the drawings, there are diagrammatically illustrated three separate units, indicated generally at I, II and III, and said units are provided, respectively, with conventional gathering machines A1, A2 and A3. The gathering machines have the usual signature receiving boxes which are diagrammatically illustrated and are numbered, respectively, a1, a2 and a3 for the three gathering machines A1, A2 and A3. Being a diagrammatic view FIG. 1 does not show the actual number of boxes in the three gathering machines; but as previously stated herein the gathering machines A1 and A2 may have 48 boxes each, while the gathering machine A3 may have 32 boxes. As is well known in the art, a gathering machine has different signatures in each box, and gathers signatures from the several boxes into a single pack which may then go to a binding machine.

Figure 2:
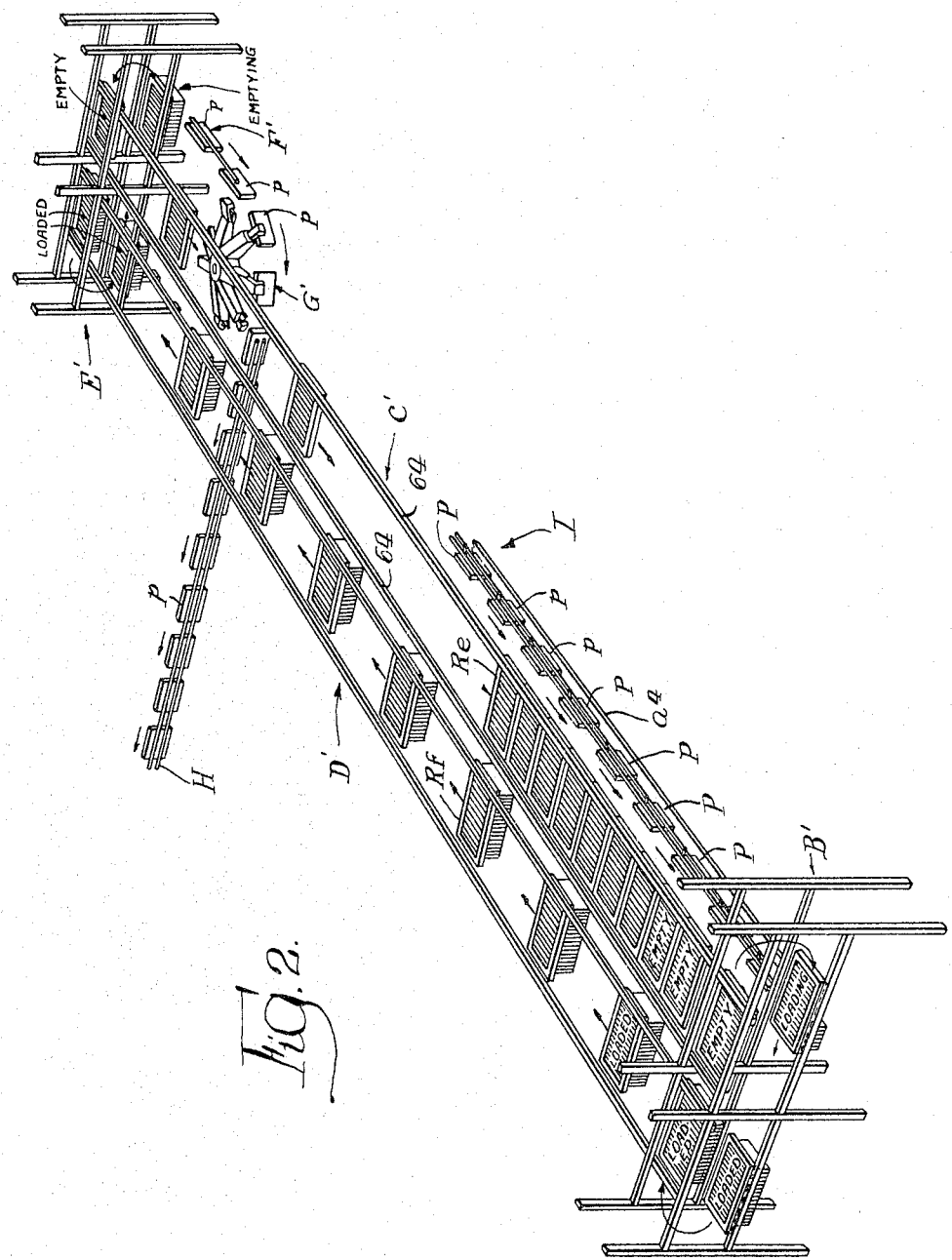

Each of the gathering machines includes a conventional signature pack delivery conveyor, indicated as a4 in FIG. 2, which moves signature packs P seriatim in evenly spaced relationship with the signatures in each pack jogged into the necessary register for binding and with each pack supported on edge.

Each of the units I, II and III includes the same major components, and in the following general description only the components of the unit I will be specifically referred to, while in FIG. 1 the identical major components of the units II and III will be designated by the same reference letters combined with unit identifying numerals as in the case of the gatherers A1, A2 and A3.

As seen in FIGS. 1 and 2, the unit I has a loading station B1 toward which the packs P of signatures are transported by the pack conveyor a4, and the loading station B1 is adapted to receive empty signature pack storage and transfer racks Re which are carried in an overhead storage and return mechanism C1 which moves the empty racks Re toward the loading station. Full racks Rf are moved from the loading station B1 into a full rack storage and forwarding means D1 in which the racks full of signature packs are moved toward an unloading station E1. At the unloading station E1 the racks are moved one at a time through the unloading station, where unloading means F1 takes the packs seriatim from the racks and passes them to a conveyor feeder, indicated generally at G1, which in turn deposits the packs upon a pack conveyor H for travel into a binding machine J. As seen in FIG. 1, the pack conveyor H may receive packs of signatures from the signature feeder G1 of the unit I, and also from the signature feeder G2 of the unit II, and the signature feeder G3 of the unit III.

It is clear from FIG. 2 that the storage and return means C1 and the storage and forwarding means D1 each has adequate storage space for a large number of the racks, and thus the storage and forwarding means D1 provides facilities for forming a storage pool of packs of signatures carried in the full racks Rf, so that a breakdown of the gatherer A1 ordinarily need not cause a shutdown of the binder J. Conversely, there is usually enough space in the storage and forwarding means D1 to receive full racks from the loading station B1 even though the binder J may be temporarily shut down, thus ordinarily permitting continuous use of the gatherer A1. Similar considerations apply to the units II and III.

As will be described in more detail in connection with the unloading station, the unloading means, the conveyor feeders, and the pack conveyor, the complete system disclosed in the present application affords a great deal of flexibility in operation. When a large catalog is being prepared which requires in excess of 48 signatures, packs of 48 signatures are made up by the gathering machine A1 to form a part of the catalog. If no more than 96 signatures are required for the complete catalog, all the additional signatures are made into packs by the gatherer A2; while if more than 96 signatures are required the gatherer A3 is also employed. In this mode of operation, of course, all the signatures are different, so the packs in each unit are different from those in the other units. The pack conveyor H first receives a pack of signatures from the unit III, the pack of signatures from the unit II is placed on the pack conveyor H in face abutting relationship to the pack from the unit III, and finally the pack from the unit I is placed against the pack from the unit II so that all of the signatures for a single catalog, consisting of the three separate packs, are on the pack conveyor H in the required position to be bound into a single catalog by the binding machine J.

As previously pointed out, binder J has a maximum rate of operation approximately twice that of either of the gatherers, and if a small catalog is being prepared which requires no more than 48 signatures the gatherer A1 and the gatherer A2 may both be used to gather identical packs of signatures. Operation of the unloading stations E1 and E2, the unloading means F1 and F2, and the conveyor feeders G1 and G2 is then modified so that the pack conveyor H receives signature packs alternately from the feeder G1 and the feeder G2. The means of accomplishing this change of operation, which may be described as a change from two-up delivery to one-up delivery, will be described in detail in connection with the detailed description of the unloading station and the associated major components which cooperate to deliver the signature packs to the pack conveyor H.

*General description of loading station B1*

Figure 3:
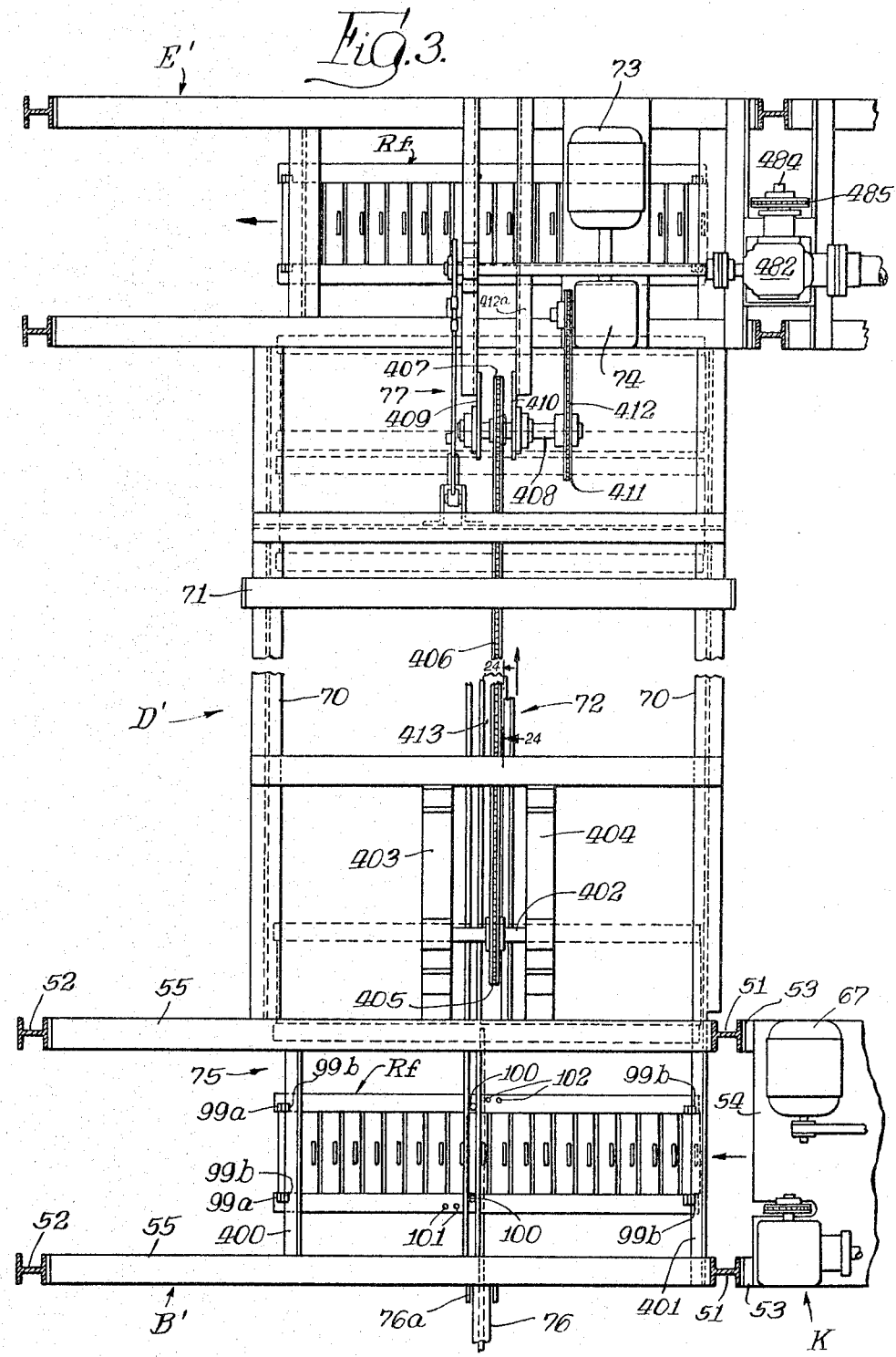
FIG. 3 is a fragmentary plan view of one loading station, one unloading station, and with the central area of the full rack storage and forwarding means broken away.
Figure 4:
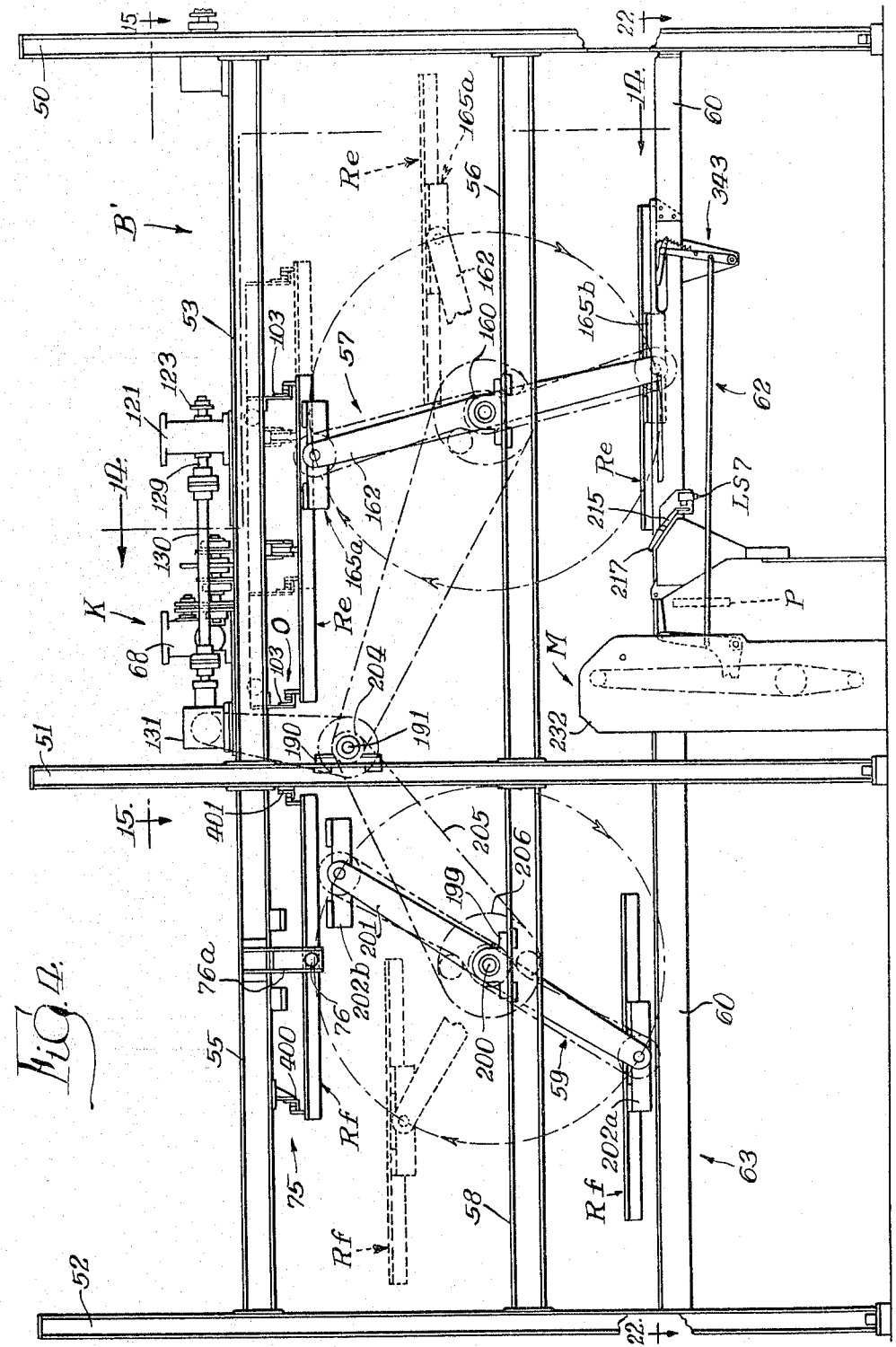
FIG. 4 is an end elevational view of one unit, viewed from the loading station end.

Referring now to FIG. 3, which includes a plan view of part of the loading station B1, and to FIG. 4 which is a front elevational view of the entire loading station, the station is seen to be generally rectangular and to be carried on 3 pairs of supporting columns 50, 51 and 52. Between the columns 50 and 51 are upper deck channels 53 which support a return rack deck plate 54 which carries a rack handling drive, indicated generally at K. Mounted between the columns 51 and 52 are upper deck channels 55 which support a receiving mechanism for delivering full racks Rf to the full rack storage and forwarding means D1. Spaced below the upper deck channels 53, the columns 50 and 51 carry supporting channels 56 for empty rack lowering arms, indicated generally at 57; while supported between the columns 51 and 52 in the same plane with channels 56 are supporting channels 58 for full rack elevating arm, indicated generally at 59. The arms 57 and 59 are both driven by the rack handling drive K. Supported at a still lower level on the columns 50, 51 and 52 are parallel front supporting structures 60 and rear supporting structures 61 (see FIGS. 22a, b and c and 23a, b and c) for rack loading transfer means, the drive for which is indicated generally at M in FIG. 4. The rack loading transfer means receives racks from the rack lowering arms 57 in an infeed end of the loading station, indicated generally at 62, and moves them through the loading station to a delivery end indicated generally at 63, where the full racks Rf may be picked up by the rack arms 59 for upward movement to the storage and forwarding means D1. The rack transfer drive M is arranged to move each rack stepwise through the loading station B1 while a rack loading mechanism, indicated generally at N (FIG. 5) loads signature packs P individually into the loading racks at a loading point which is indicated in FIG. 4 by a broken line showing of a pack P.

As previously described, when the system is being used to prepare a large catalog requiring signature packs from more than one unit, the packs from the various units are delivered to the pack conveyor belt H in a two-up or three-up arrangement, and from this it is clear that the three units must all contain the same number of packs, and there can be no empty spaces in the racks. However, the signature gathering machines sometimes fail to deliver a complete pack and the incomplete pack must be removed by an operator, and there may be instances in which no pack is in a particular position on the pack delivery conveyor A4. In order to avoid empty spaces in the storage and transfer racks, the rack loading mechanism N includes sensing means to detect the absence of a pack of signatures from the loading mechanism; and this sensing means provides a control for the rack loading transfer drive M to suspend the stepwise movement of a rack through the loading station until such time as a pack of signatures is available in the rack loading mechanism N. This entire mechanism will be described in detail hereafter.

Starting and stopping of the rack handling drive K which drives the rack lowering arms 57 and rack elevating arms 59 is controlled by various switches in an electric circuit (see FIG. 36), which are actuated by a full rack reaching a certain position in the delivery end 63 of the loading station, or by a rack which is being loaded reaching a certain position with respect to the infeed end of the station. In FIG. 4 the lowering arms 57 and elevating arms 59 are illustrated in full lines in a position of motion, just after a full rack Rf has been picked up by the elevating arms and just as an empty rack Re is about to be deposited in the loading station by the lowering arms 57.

One normal rest position of the arms is with the elevating arms 59 substantially vertical, so their lower ends are beneath a rack and ready to engage and elevate the rack promptly upon its arrival in the delivery end 63 of the loading station. In this position of the elevating arms 59, the lowering arms 57 are supporting an empty rack Re in a normal ready position.

Under normal operating conditions, with no gaps in the packs of signatures entering the loading mechanism N, movement of the arms 57 and 59 continues from the time they are started until a full rack has been positioned for delivery to the rack storage and forwarding means D1. Under these conditions an empty rack is deposited by the arms 57 with its front end just clearing the rear of a rack in process of being loaded. However, if the movement of the rack in process of loading is delayed because of a missing pack P, as heretofore described, rotation of the arms 57 and 59 is suspended until the rack being loaded is moved far enough so that its rear end has cleared the next succeeding rack which is deposited by the arms 57. These controls will be described in detail in connection with the rack handling drive K.

*General description of rack storage and return means C1*

Referring particularly to FIGS. 15, 16 and 27, the empty rack storage and return means C1 includes a set of overhead rack carrying rails 64 which extend continuously from the unloading station E1 to the loading station B1 and are suspended from the ceiling by means of a plurality of suitably spaced hanger brackets such as the brackets 65 seen in FIG. 27. The storage and return mechanism also includes a power and free conveyor system, indicated generally at 66 in FIGS. 15 and 27, which is driven by a motor 67 operating through a speed reducer 68, both mounted on the upper deck plate 54 of the loading station B1. The power and free conveyor 66 is driven continuously by motor 67, but has rack engaging pushers which are arranged to push a rack only until it is close behind the next preceding rack on the rails 64, whereupon the pusher is disengaged to leave the rack free. No re-engagement of the pusher with the rack can occur until the next preceding rack is moved further along the rail 64. The details of the power and free conveyor system will be described hereafter.

The rack storage and return means C1 terminates adjacent the loading station B1 in a rack positioning mechanism, indicated generally at O in FIGS. 15, 16, 20 and 21. Such mechanism is used in the unit I to move the empty racks from the line of the return rails 64 to a laterally offset position where they may be picked up by the lowering arms 57. Mechanism equivalent to the positioning mechanism O need not be used in all units, as its inclusion is necessitated only by certain clearance problems in the arrangement of the complete system.

It is necessary to release racks from the storage and return rails 64 to the positioning mechanism O one at a time and for this purpose the storage and return means C1 also includes escapement mechanism, indicated generally at 69 in FIGS. 15, 17 and 18, which controls the release of racks singly to the rack positioning mechanism. Operation of the rack positioning mechanism O and of the escapement 69 is through the rack handling drive K, in conjunction with the operation of rack lowering arms 57 and rack elevating arms 59 in the loading station B1. A detailed description of this entire mechanism and its drive and control will be provided hereafter.

*General description of the full rack storage and forwarding means D1*

The full rack storage and forwarding means D1 is substantially identical in all major respects with the empty rack storage and return mechanism C1, and is seen in FIG. 3 to include parallel rack supporting rails 70 which are suspended from the ceiling by suitably spaced hanger brackets 71, and which extend continuously from the loading station B1 to the unloading station E1. The storage and forwarding means D1 also includes a power and free conveyor, indicated generally at 72, which is driven by a motor 73 through a speed reducer 74.

Mounted upon upper deck channels 55 of the loading station B1 is a full rack receiving mechanism, indicated generally at 75, in which the rack elevating arms 59 deposit a full rack Rf, and the receiving mechanism includes a hydraulic ram 76 which operates in timed relationship with the rotation of arms 59 to push each rack out of the receiving station 75 and into the grip of the power and free conveyor 72.

The storage and forwarding means D1 also includes an escapement, indicated generally at 77 in FIG. 3, the mechanism of which is illustrated in detail in FIG. 26. Escapement mechanism 77 operates to release the full racks Rf one at a time from the storage and forwarding means D1 onto rack positioning rail sections 78 from which they are lowered into the unloading station E1 by rotary arms in said station which are identical with the rotary arms 57 for lowering the empty racks into the loading station B1. There are no clearance problems in the location of the storage and forwarding means D1, so no full rack positioning mechanism comparable to the mechanism O is required.

*General description of unloading station E1, unloading means F1, and conveyor feeder G1*

Referring now particularly to FIGS. 25 to 35, inclusive, the structure of the unloading station E1 is substantially identical with that of the loading station B1, but the mechanism is a great deal simpler because there is no need to arrest the motion of racks R through the unloading station.

Full rack lowering arms, indicated generally at 79, are positioned to remove the racks from the positioning rails 78 and lower them into an infeed end 80 of the unloading station. Rack unloading transfer means, indicated generally at 81 in FIG. 32, advances the full racks successively through the unloading station to an outfeed end 82 of the station, and as the packs P arrive at an unloading position 83 the packs are removed by the unloading means F1, which is substantially identical with the loading means N, so that the rack is empty when it reaches the outfeed end 82 where it is picked up by empty rack elevating arms, indicated generally at 84, and deposited in an empty rack receiving mechanism, indicated generally at 85. The receiving mechanism 85 includes a hydraulic plunger 86 which pushes the empty racks one at a time from the receiving mechanism 85 into the grip of the power and free conveyor 66.

Figure 33:
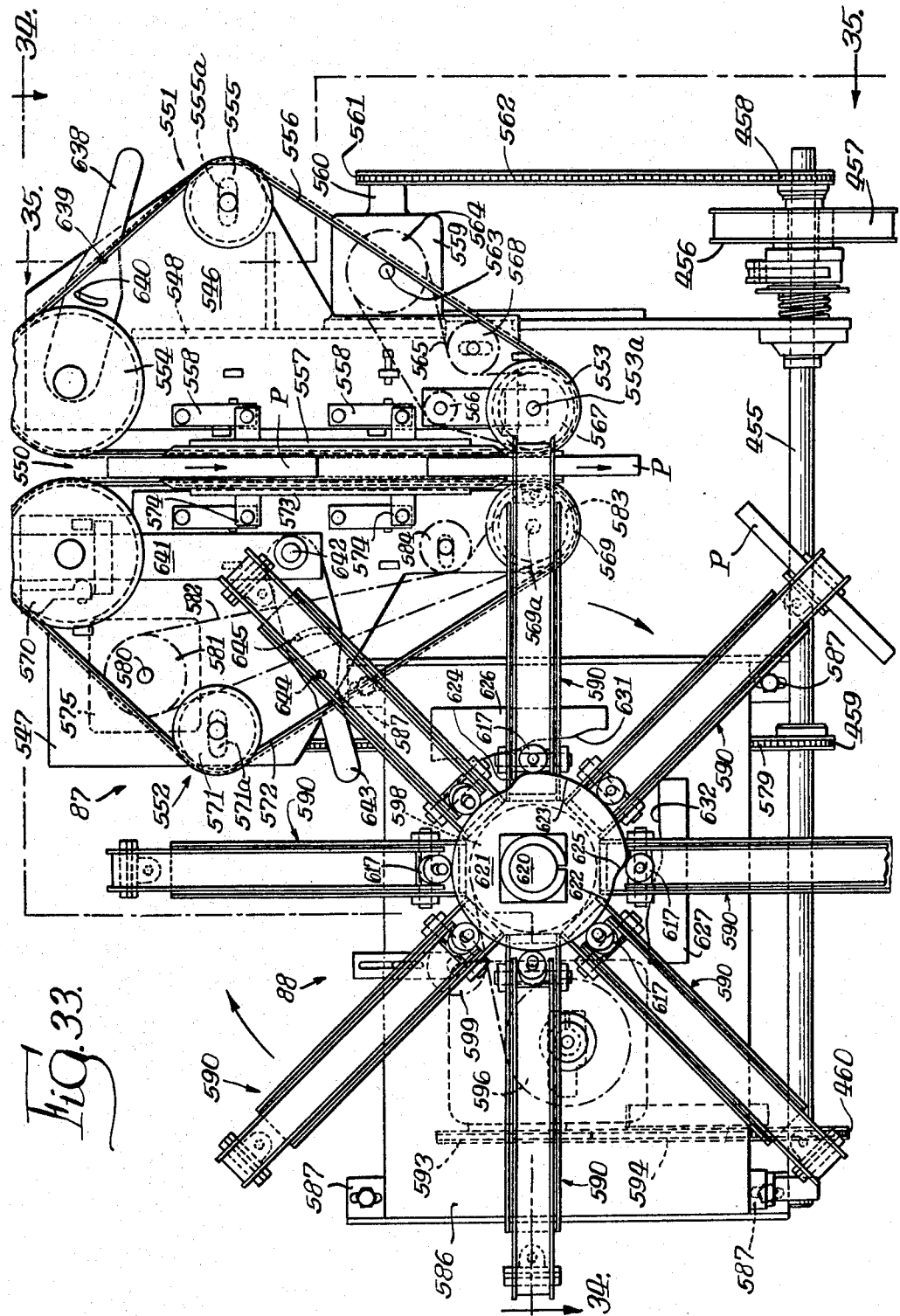
FIG. 33 is a plan view of the pack unloader and conveyor feeder.

As best seen in FIG. 33, the conveyor feeder means includes both a feeder belt unit, indicated generally at 87, which receives packs from the unloading means F1, and an eight armed rotating head, indicated generally at 88, which receives packs from the unit 87 and deposits them on the pack conveyor H. Each arm of the rotating head has cam controlled jaws which grip a pack P before it leaves the feeder belt unit 87. When the rotation of the head 88 has moved the arm carrying any particular pack P 90° from the feeder belt unit 87 its jaws are opened and the pack is released on the continuously moving pack conveyor H for travel into the binding machine J.

The rack unloading transfer mechanism 81, the reciprocating clamp mechanism 87, and the rotating head 88 are all driven from the same motor which operates the binding machine J and the pack conveyor H, so that these elements are always operated in timed relationship.

When a large catalog is being produced requiring signature packs from the unit I and the unit II, and perhaps the unit III, the unloading transfer mechanism 81 and the unloading means F1 are driven at a predetermined speed, and a pack P is delivered by the belt unit 87 to each of the eight arms of the rotating head 88.

In the preparation of a small catalog requiring no more than 48 signatures, a gear shift mechanism, indicated generally at 89 in FIG. 38, is operated to drive the unloading transfer mechanism 81 and the unloading means F1 at half speed, while the belt unit 87 and rotating head 88 are driven at full speed. The control cams for operating alternate jaws of the rotating head 88 are disabled to take those jaws out of operation, and only the four operating sets of jaws receive packs P. Furthermore, the rotating head 88 is shifted bodily toward the pack conveyor H so that, instead of depositing a pack P at a position on the conveyor H which will place it against a pack already on the conveyor, each pack is deposited upon the conveyor in contact with inclined supporting means of the conveyor H which retains the pack in inclined position. In this mode of operation, successive pack receiving stations of the conveyor H receive packs alternately from the conveyor feeder G1 and from the conveyor feeder G2.

*Detailed description of storage and transfer racks R*

Referring now to FIGS. 19, 20 and 21, an empty storage rack Re is illustrated in the rack positioning mechanism O, and is seen to include a pair of parallel angle members 90 which provide side frames that are tied together by cross pins 91. Each cross pin acts as a carrier pin for a pair of pack gripping jaws, indicated generally at 92. As best seen in FIG. 20, each pair of jaws 92 includes a fixed jaw plate 93 and a movable jaw plate 94 which is in the form of a bell crank pivoted on the pin 91. An inclined arm 95 of the bell crank extends longitudinally of the rack and carries an actuating pad 96 by means of which the jaws may be opened to receive a pack of signatures at the loading point. Movable jaw 94 is urged into the closed position illustrated in FIG. 20 by means of six coil springs 97 (FIG. 21).

Surmounting both ends of the side frame members 90 are roller brackets 98 which carry supporting rollers 99a and 99b on which the rack R is carried in the storage and return means C1, and in the storage and forwarding means D1.

At the center of each side rail 90 is an upstanding roller guide 100 which rides between guide rails 100a of the conveyor system (see FIG. 24a) to hold the racks square with the return rails 64 and the forwarding rails 70. On one of the side rails 90 adjacent the drive lugs 100 are drive and escapement lugs 101, and on the opposite side rail on the other side of the guide lug 100 are drive and escapement lugs 102, which cooperate with the power and free conveyor 66 and with the escapement means 69 of the storage and return means, and also with the conveyor 72 and the escapement means 77 of the storage and forwarding means.

Each of the racks R has 20 sets of jaws 92, and thus is capable of storing and transferring 20 signature packs P which are suspended in the jaws side by side, and in spaced relationship.

*Detailed description of rack positioning mechanism O*

As best seen in FIGS. 15, 16 and 19 to 21, the rack positioning mechanism O includes a pair of angle members 103 on which the rack rollers 99a are supported, and said angle members are suspended from a carriage 104 by means of brackets 105. Carriage 104 is mounted for lateral shifting movement between a rack receiving position in which the angle members 103 are aligned with an inclined escapement track section 106 (FIG. 17), and a rack discharging position which is indicated in broken lines in FIG. 16. Carriage 104 includes a rectangular frame having side rails 107 and end plates 108, best seen in FIG. 19, and extending outwardly from the side rails 107 adjacent the end plates 108 are stub shafts 109 for supporting rollers 110 by means of which the carriage 104 is carried upon inwardly extending lower web portions 53a of the top deck channels 53 in the loading station B1. Extending outwardly from beneath the side frame members 107 are guide roller brackets 111 which carry vertically spindled guide rollers 112 that bear upon the inner edges of the webs 53a to retain the carriage on said webs. Beneath carriage 104 is a rack locating means including guide rails 104a which receive the guide rollers 100 on a rack as they leave the guide rails 100a of the conveyor system to precisely locate the racks for pick-up by the lowering arms 57.

At the right hand end of carriage 104, as seen in FIGS. 15, 16, 19 and 20, is an upstanding bracket 113 which supports a gear rack 114 by means of which the carriage 104 may be moved between its rack receiving and rack discharging positions. Gear rack 114 is operatively connected with a carriage reciprocating mechanism, indicated generally at 115, which is driven from the rack handling drive K.

Rack handling drive K includes an electric motor 116 which is connected through an electric clutch and brake mechanism 117 to drive sprocket 118 for a chain 119 which encircles an input sprocket 120 of a gear reducer 121. The gear reducer 121 has a first output shaft 122 carrying a sprocket 123 around which is trained a chain 124 which is also trained around a second sprocket 125 on an intermediate shaft 126 that is supported in bearing blocks 127, which are mounted on the return rack deck plate 54 of the loading station and on a supporting deck plate 128 which is located between the columns 50.

Gear reducer 121 also includes a second output shaft 129 which is coupled to a drive shaft 130 that drives a gear box 131 to furnish the power for the rotary arms 57 and 59 by means of which the empty racks Re are lowered into the loading station and the full racks Rf are elevated from the loading station.

Also supported on deck plate 128 is a gear box 132 having an input shaft 133 with a sprocket 134 around which is trained a drive chain 135 that is also trained around a sprocket 136 on the extreme end of intermediate shaft 126, so that the gear box 132 is driven from the rack handling drive motor 116.

Extending downwardly from gear box 132 through an opening in deck plate 128 is an output shaft 137 which carries a cam 138, and rotation of cam 138 acts through a cam follower mechanism, indicated generally at 139, to produce the necessary reciprocation of the gear rack 114 and carriage 104.

Cam follower mechanism 139 includes a bracket 140 on which a cam follower arm 141 is pivotally mounted, and a follower spring link 142 for a follower spring 143 is pivoted at one end upon a bracket 144 on one of the upper deck channels 53, and has its other end pivotally connected to the follower arm 141 so that the follower spring urges a follower roller 145 on the arm 141 against the cam 138.

Mounted upon the upper deck channel 53 opposite the follower spring rod bracket 144 is a fixed gear rack bracket 146 which supports a fixed gear rack 147. A carriage 148 is connected by a link 149 to cam follower 141 at 150, and a gear 151 in the carriage 148 meshes with the fixed rack 147 so that when the carriage is reciprocated by operation of the follower arm 141 the gear 151 is rotated in the carriage.

A cross shaft 152 carries a gear 153 which is aligned with the gear 151, and also carries a pinion 154 which engages the gear rack 114; and a bifurcated bracket 156 journaled upon the cross shaft 152 carries bearing rollers 157 which hold the gear rack 114 in engagement with the pinion 154.

Transmission of motion from carriage 148 and gear 151 to gear 153 is by means of free gear rack 158 which rests upon gear 151 and gear 153 is held in contact therewith by bearing rollers 159 which extend outwardly from a portion of the bracket 146.

From the foregoing description it is apparent that movement of cam follower arm 141 in response to rotation of cam 138 reciprocates the carriage 148, and this acts through the gear 151, the gear rack 158, the gear 153, and the pinion 154 to reciprocate the gear rack 114 and thereby move the carriage 104 between its rack receiving and rack discharging position.

*Detailed description of rack lowering arms 57, rack elevating arms 59, and the drive and control for said arms*

Details of the rack lowering arms 57 and their related components are best seen in FIGS. 14, and 14a to 14d, while the controls for starting and stopping rotation of said arms and of the rack elevating arms 59 are seen both in FIGS. 22a to c and 23a to c, inclusive, and in the wiring diagram FIG. 36.

Referring now to FIG. 14, carried on the supporting channels 56 of loading station B1 are bearing blocks 160 in which a rack lowering arm shaft 161 is journaled. Fixedly mounted on shaft 161 are parallel arms 162, the space between said arms being substantially greater than the width of a storage and transfer rack R. At the two ends of said arms 162 are bushings numbered, respectively 163a at the upper ends of arms 162, and 163b at the lower ends of said arms; and stub shafts 164a and 164b journaled, respectively, in the bushings 163a and 163b, mount rack carriers, indicated generally at 165a and 165b, so said carriers are rotatable with respect to the arms 162. It is essential that the rack carriers 165a and 165b remain horizontal as the arms 162 rotate, and for this purpose rack orienting means, indicated generally at 166, is provided. The orienting means 166 includes double sprockets 167 and 172 which are journaled at both ends of shaft 161 and fixed against rotation by locking pins 168 which key the sprockets 172 to brackets 169 on the supporting channels 56. Trained over the fixed spockets 167 are roller chains 170 which are also trained around sprockets 171 keyed to the stub shafts 164a. Similarly, roller chains 173 are trained over the fixed sprockets 172 and over sprockets 174 which are keyed to the stub shafts 164b. Thus, as the shaft 161 and the arms 162 rotate, the fixed sprockets and the chains of the orienting means 166 cause the rack carriers 165a and 165b to remain in a horizontal position. As seen in FIGS. 14a and 14b, the orienting means 166 also includes idler sprockets 167a and 172a which act to tension the chains 170 and 173, respectively.

As best seen in FIGS. 14a and 14c, the rack carriers 165a and 165b are identical in structure, and accordingly, only the rack 165b is described in detail. The rack carrier includes a yoke 175 which is keyed to the stub shaft 164, and at the lower margin of the yoke are spaced bosses 176 to receive pins 177. On each pin a rack supporting latch 178 is pivotally mounted, and a torsion spring 179 wound around each of the pins 177 has one end 180 anchored to the yoke 175 and the other end 181 engaging a pin 182 on latch 178 to normally urge the latch outwardly to a rack supporting position as seen in FIG. 14c.

The length of the arms 162 is such that when an empty rack Re is supported on the rails 103 of the rack positioning mechanism O in its rack discharging position the rack carrier 165a moves its supporting latches 178 smoothly underneath the laterally extending webs 90a of the rack side frames 90, and when the arms 162 are vertical the rack is lifted off the supporting rail 103 by a fraction of an inch and thereupon is supported by the carrier 165a. From a consideration of FIG. 4 it is apparent that when the arms 162 have passed beyond the position in which they appear in that view, the empty Rack Re supported upon the rack carrier 165b will be deposited in the loading station. The front and rear supporting structures 60 and 61, previously referred to in the general description of the loading station, include parallel rack supporting rails 60a and 61a (see FIGS. 22a to 22c) upon which the empty racks are deposited by the rack carriers 165a or 165b. While these supporting rails are not visible in FIG. 14, it may be stated that when the arms 162 rotate to the point where they can deposit an empty rack upon the rails, the latches 178 are just outside the rails and the racks are inside the rails with the laterally extending side flanges 90a resting upon the rails.

In order to avoid having the continuing rotation of the arms 162 bring the supporting latches 178 back underneath the flanges 90a so as to lift the forward end of the rack, it is necessary that the latches be retracted as the rack is deposited; and this is accomplished by the mechanism illustrated in FIG. 14d. As seen in FIG. 22a, two identical latch retracting cam arms, indicated generally at 183, are mounted in the rails 60a and 61a, but only the one in the rail 60a is described in detail. The cam arm 183 is pivoted at 184 in the side rail 60a, and a compression spring 185 interposed between the rail and a forward end 186 of the cam arm keeps the rearward end portion 187 of the arm close enough to the rail 60a that the spring loaded latches 178 may pass freely over the outside of it. However, the more forward of the two latches (designated as 178a in FIG. 14a) then strikes a cam surface 188 on the arm 183 and pivots it against the urging of spring 185 to swing the rearward end portion 187 of the arm outwardly to the broken line position where the cam surface 189 is contacted by the more rearward latch 178b so as to retract that latch against the urging of latch spring 179. The contact of the latch 178a with the cam surface 188 has already retracted that latch, and accordingly the two latches remain in a retracted position until they have cleared the laterally extending flange 90a of the rack.

As previously stated in connection with the rack handling drive K and the positioning mechanism O, the rack lowering arms 57 and elevating arms 59 are driven from rack handling drive motor 116 through the gear reducer 121, the second output shaft 129 of said gear reducer, and the drive shaft 130 which drives gear box 131. For this purpose a pair of bearing blocks 190 are mounted upon the supporting columns 51 of the loading station, and a shaft 191 is journaled therein. A sprocket 192 on the shaft 191 receives a drive chain 193 which is also trained around a drive sprocket 194 on an output shaft 195 of the gear box 131. A sprocket 196, which is on the right-hand end of shaft 191 as viewed in FIG. 14, carries a drive chain 197 which is also trained around a sprocket 198 that is keyed to the rotary arm supporting shaft 161 of the rack lowering arms 57.

The rack elevating arms 59 are generaly like the lowering arms 57, and thus are not described in detail other than to say that, as seen in FIG. 4, bearing blocks 199 mounted upon the supporting channels 58 carry a shaft 200 for rotatable arms 201, and at opposite ends of the arms 201 are rack carriers 202a and 202b. Since it is sometimes necessary for the rack carriers 202a and 202b to move into their lower, or pick up positions after the rack is nearly full, they also have retractable latches (not shown) which snap past the supporting flanges 90 on the sides of the rack as they pass beneath it. No mechanism comparable to the pivoted cam arms 183 is required, however.

The drive for the rack elevating arms 59 is seen in FIGS. 4 and 14 to be derived from a sprocket 204 on that end of shaft 191 which is to the left in FIG. 14, and a roller chain 205 trained around said sprocket is also trained around a sprocket 206 which is on the forward end of shaft 200 as viewed in FIG. 4.

As previously indicated in connection with the general description of the loading station B1, rotation of the rack lowering arms 57 and rack elevating arms 59 is controlled principally by the position of racks in the loading station. When a rack is completely full its forward end moves into contact with a switch actuator 207 which is pivoted at 208 on a plate 209 in the delivery end 63 of the unloading station. Actuator 207 is urged toward an upright position by a tension spring 210 so that an upper end 211 projects into the path of a rack. An actuating cam face at the lower end of the actuating arm closes a limit switch LS5 when the actuator is rotated counterclockwise, and an arcuate holding cam surface 213 holds the switch LS5 closed as long as a rack is bearing upon the actuator 207.

Referring now to FIGS. 22b and 23b, slightly in the infeed direction from the loading position (which is indicated by the pack P in FIG. 23b), a bracket 214 is mounted upon one of the sides plates, and a switch actuating lever 215 is pivoted at 216 on said bracket. Switch lever 215 has an upper end 217 which projects into the path of a rack, and a switch plate 218 at the lower end of arm 215 actuates a limit switch LS7 which is normally closed, but which is held open by switch plate 218 whenever a rack is resting upon the upper end 217 of lever 215.

Referring now to FIG. 36, it will be recalled that rack handling drive K includes a motor 116 which is connected through an electric clutch and brake mechanism 117. Since the lowering and elevating arms, the rack positioning mechanism O, and the rack return escapement mechanism 69 must all operate in coordination, all these elements are driven by the rack handling motor 116; and since the various elements driven by motor 116 must be started and stopped promptly, the motor is permitted to run constantly (see FIG. 37 for start and stop controls of motor 116) and the control of the driven components is by suitable actuation of the electric clutch and brake mechanism 117.

As seen in FIG. 36, the clutch brake mechanism 117 includes a rack handling clutch 117a and a rack handling brake 117b, and these are parts of a standard commercially available device which has its own control circuitry requiring a transformer T. As indicated, the brake circuit is normally closed and the clutch circuit is normally open, so that operation of motor 116 does not drive the rack handling mechanism.

The control circuit includes the normally open switch LS5, the normally closed switch LS7 in parallel with the switch LS5, a normally closed switch LS8 also in parallel with LS5 and LS7, and a normally closed switch LS6 which is in series with both the parallel circuits LS7 and LS8.

LS6 and LS8 are both physically located upon one of the supporting channels 58 where they may be controlled by actuating cams on the arms 201 of the rack elevating arms 59. Normally closed switch LS6 provides a holding circuit to continue driving the rack handling mechanism even after lifting of a full rack by one of the elevating carriers 202a or 202b has permitted LS5 to open. LS7 and LS8 act to prevent interference between the racks.

Assuming that the lowering and elevating arms are being rotated, LS6 opens when the elevating arms 59 have completed a cycle and are in position to recieve a new full rack. This opens the clutch circuit and closes the brake circuit to stop the drive.

When a full rack closes LS5 it remains closed until the elevating arms, rotating clockwise, have moved approximately 7 degrees beyond a vertical position; but in the meantime LS6 has been closed when the rack elevating arms reached a position approximately 5 degrees from the vertical. Accordingly, if LS7 and LS8 remain closed, the arms can then continue to rotate until LS6 is reopened by completion of a cycle when the arms 59 are again in position to receive a full rack.

However, as long as a rack is bearing upon the upper end 217 of lever 215, LS7 is open, and the drive is stopped unless LS8 is closed.

LS8 is closed through almost the entire operation of the unit, being open only when the full rack elevating arms have moved approximately 30 degrees beyond a vertical position, and remaining open only for 5 degrees. As long as LS8 is closed, the drive circuit is closed, even though LS7 may be open; and the position at which LS8 is open is just before an empty rack entering the station would interfere with the rack ahead of it. As soon as the preceding rack has cleared LS7, the circuit is closed through that switch and the arm rotation reecommences.

*Detailed description of rack transfer drive M and rack loading mechanism N*

The rack loading transfer means M which advances the racks R stepwise through the loading station B1, and the loading mechanism N which loads packs of signatures P into the jaws 92 of the racks, are best seen in FIGS. 5–13, 22a and b and 23a and b, inclusive. FIGS. 5–9 are directed primarily to the loading mechanism M and major components of the drive for both the mechanism M and the rack transfer means N, while FIGS. 10–13, 22a and b and 23a and b are directed primarily to the rack transfer means and its drive.

Figure 5:
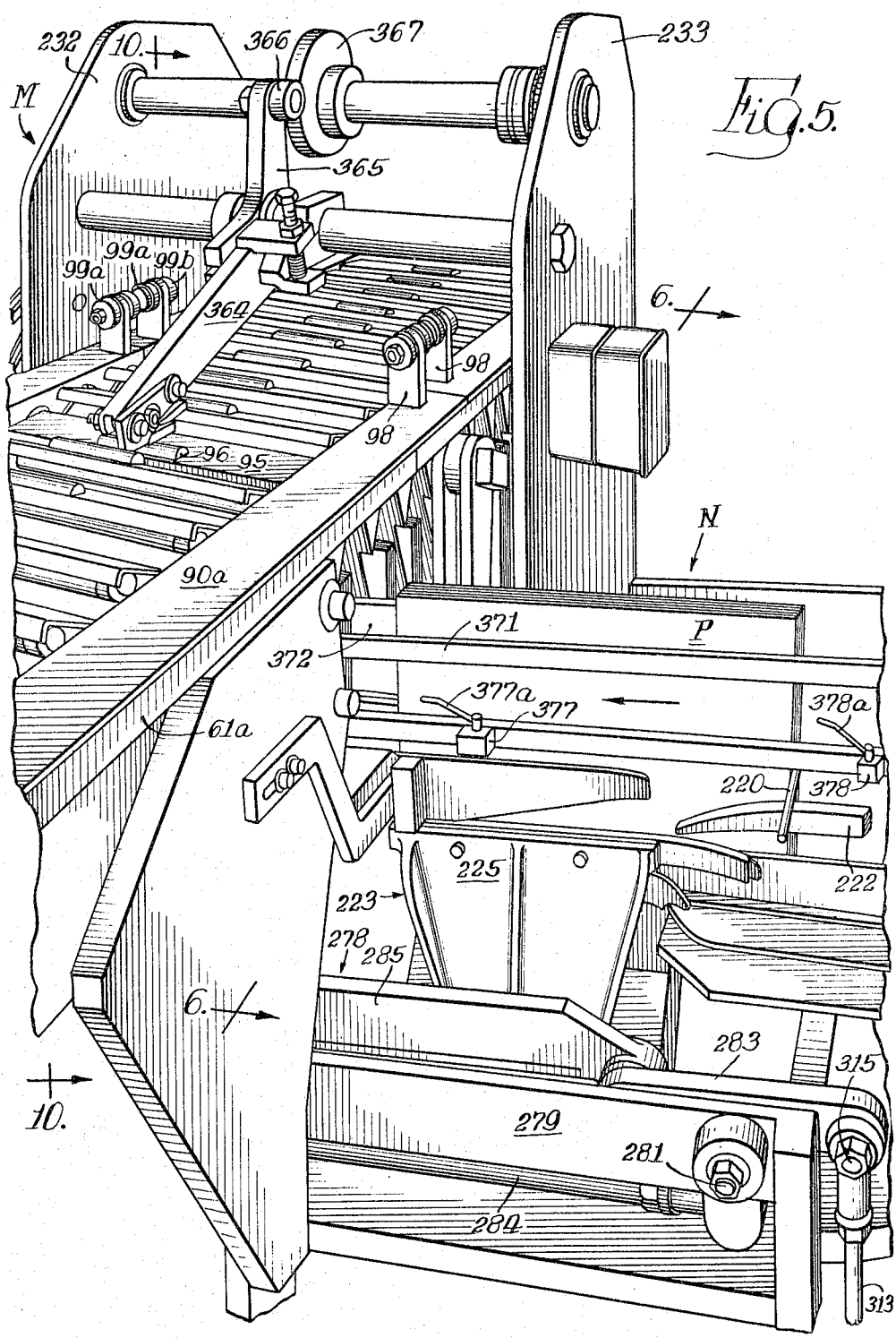
FIG. 5 is a perspective view of a portion of the loading station and the signature pack transfer apparatus for feeding packs of signatures seriatim to the storage rack passing through the loading station.
Figure 6:
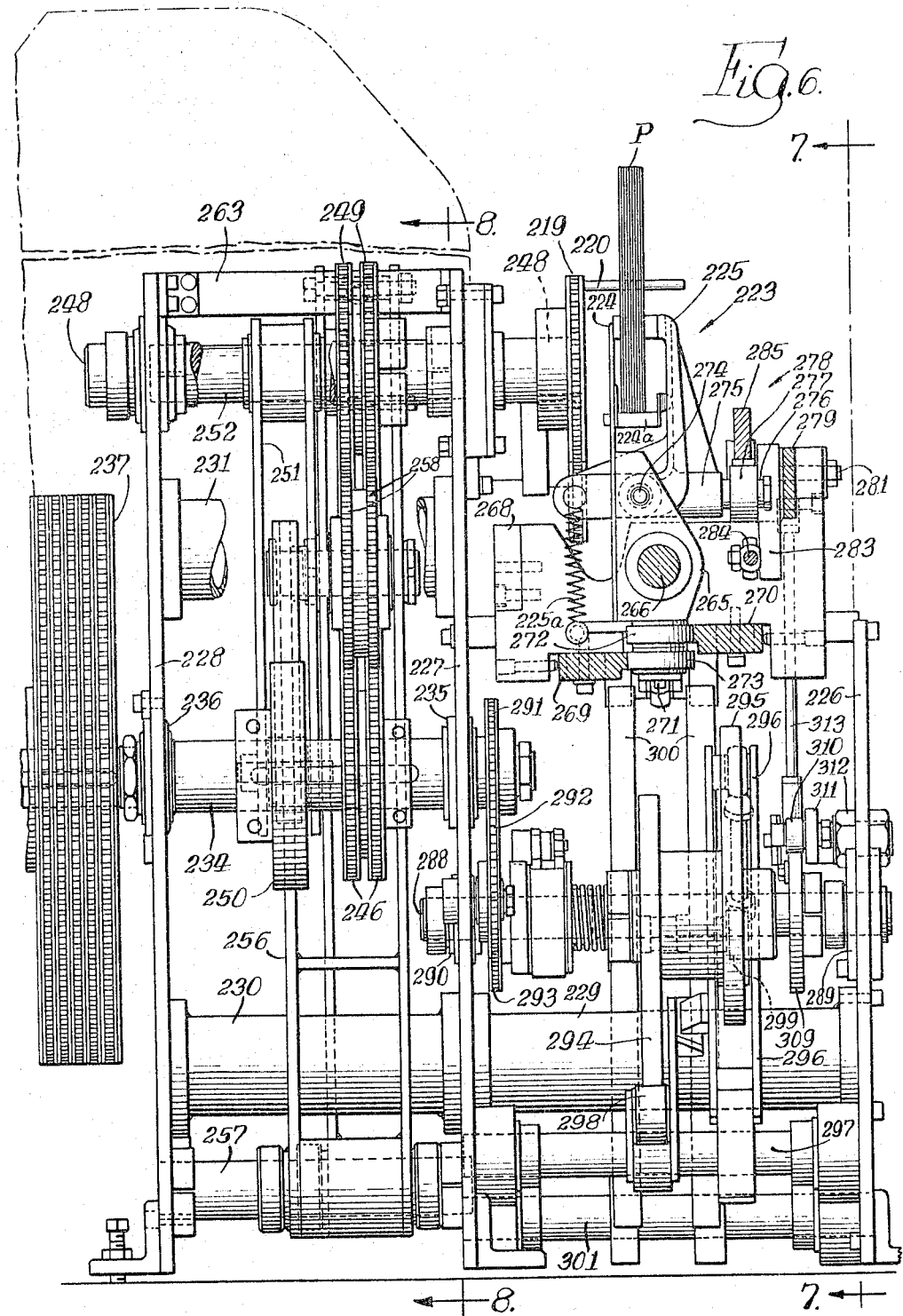
FIG. 6 is a fragmentary section taken substantially as illustrated along the line 6—6 of FIG. 5.
Figure 7:
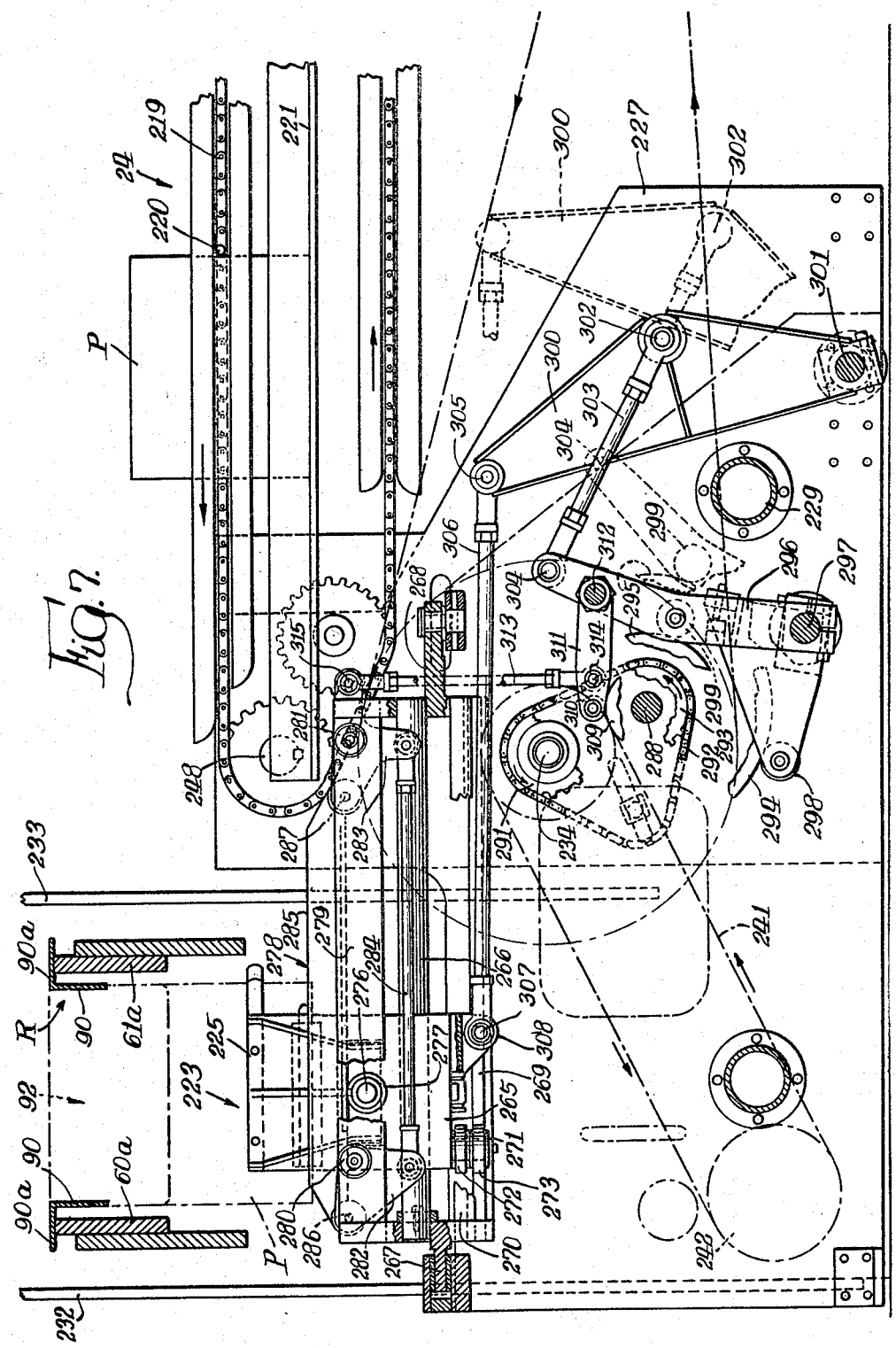
FIG. 7 is a fragmentary section taken substantially as illustrated along the line 7—7 of FIG. 6.

Referring first to FIGS. 5, 6, and 7, the pack conveyor A4 which brings packs P from the gatherer A1 to the loading station B1 is of conventional construction, and includes a roller chain 219 and laterally extending pack pusher pins 220 at regular intervals, so that the packs P are delivered seriatim to the loading station at regular intervals except in those situations where a pack is absent from any particular area of the chain. The packs are supported on a base 221 as they are moved forward by the pins 220, and as seen in FIG. 5, a guide rail 222 holds the pins up until the packs pushed by them are in the grip of a reciprocating loading clamp mechanism, indicated generally at 223. Comparison of the position of the mechanism 223 in FIGS. 5 and 7 shows that it receives a pack from the end of conveyor chain 219 and delivers it between the jaws 92 of a rack R in the loading station. To do so, its jaws 224 and 225 (see FIG. 6) must be open until they clamp upon a pack P being fed off the chain 219, must remain closed to grip the pack until it is delivered to the jaws 92 of the rack R and said jaws have closed upon the pack, and must then open before return motion of the reciprocating clamp mechanism begins. Furthermore, since the reciprocation of the clamps 223, as well as their opening and closing sequence and the opening and closing sequence of the rack jaws 92 must be in timed relationship with the arrival of packs P at the discharge end of chain 219, and since the stepwise movement of the racks through the loading station B1 must also be in timed relationship with such arrival of packs, the entire drive for the components M and N is from the motor which operates the gathering machine A1.

Referring now particularly to FIGS. 5 and 7 for the structural members which support the rack loading mechanism N and rack transfer means M, FIG. 6 shows three parallel supporting plates 226, 227 and 228 which are in planes parallel to the line of movement of the reciprocating clamps 223, the lower ends of the plates being bolted to suitable angle brackets and tied together by tubular tie bars 229 and 230. Also connecting the plates 227 and 228 is an upper tubular tie bar 231.

In addition, as best seen in FIGS. 10, 12, 22b and 23b, a front plate 232 and a rear plate 233 flank the rack supporting rails 60a and 61a in the central area of loading station B1 and serve as supports for many of the operating components of the rack loading transfer means.

Referring now particularly to FIGS. 6, 7, 8 and 9, a main drive shaft 234 is journaled in bushings 235 and 236 in the structural plates 227 and 228, respectively, and extends outwardly of plate 228 to mount a multiple input sprocket 237 which is connected by multiple roller chains 238 with a drive motor which is seen in the wiring diagram FIG. 37 where it is indicated as M1 and given a reference numeral 239.

As seen in FIG. 9, which may be considered as an extension to the left of FIG. 6 and FIG. 13, outside main multiple drive sprocket 237 shaft 234 carries a smaller multiple sprocket 240 for plural drive chains 241 that extend forward beneath the loading station and are trained around multiple sprockets 242 on the input shaft of a gear box 243. A bracket 241a on rear structural plate 233 supports a stud 241b for an idling sprocket 241c that tensions the chain 241. The gear box 243 has an output shaft 244 with a sprocket 245 from which the rack transfer drive M is driven, as will be described in detail hereinafter.

As best seen in FIG. 8, shaft 234 also carries double sprockets 246 from which a pair of drive chains 247 are operatively connected with a drive shaft 248 for pack delivery conveyor chain 219 by connection to a pair of sprockets 249 on said shaft 248. Constant tension of chain 247, and a pulsating drive of chain 219, are accomplished by components which are conventional in the drive for such a chain. Said components include a cam 250 on shaft 234, a cam follower arm 251 pivoted on a shaft 252 adjacent conveyor drive shaft 248, said arm 251 having a follower roller 253 which bears upon cam 250, an adjusting roller 254 carried on the follower arm 251 and bearing upon a bearing plate 255 of a bifurcated arm 256 which rocks upon a shaft 257 and carries at its upper end twin sprockets 258 about which the dual drive chains 247 are trained, and an additional bifurcated arm 259 which is pivoted on a shaft 260 and carries twin sprockets 261 about which the dual chains 247 are also trained. At the upper end of bifurcated arm 259 a spring supporting link 262 is mounted and connected with a cross member 263 which extends between structural plates 227 and 228, and a compression spring 264 on the spring link urges the arm 259 constantly in a direction to tension twin drive chains 247. Thus, the cam arrangement provides a pulsating drive for chain 219 and the spring loaded arm 259 provides chain tensioning means.

Referring now again to the reciprocating clamp carriage 223, the carriage is seen in FIGS. 6 and 7 to have a base 265 with a central bore by means of which it is supported upon a rod 266, the rod 266 having its front end mounted on a bracket 267 on front structural plate 232 and its rear on a bracket 268 which extends between the structural plates 226 and 227. Also mounted upon the brackets 267 and 268 are guide rails 269 and 270, and a depending spindle 271 on the carriage 265 carries an upper roller 272 which bears against the guide rail 270 and a lower roller 273 bearing against the guide rail 269, so that the carriage is maintained in an upright position. As seen in FIG. 6, the fixed clamp member 224 is secured to one side of reciprocating clamp body 265, and has a laterally extending pack supporting bar secured to it at the top of the body 265. The movable clamp member 225 is pivoted to the body on a pin 274, and extending laterally from the movable clamp member 225 is a boss 275 carrying a pivot pin 276 for a roller 277 which receives the operating pressure of a clamp actuating bar linkage, indicated generally at 278.

Actuating bar linkage 278 is mounted on a fixed mounting bar 279, one end of which is secured to bracket 267 and the other, to bracket 268. Pivots 280 and 281 adjacent opposite ends of supporting bar 279 mount a pair of bell-cranks, 282 and 283, respectively. The bell-cranks 282 and 283 have depending arms which are tied together by a tie link 284 so that they may operate in unison like arms of a parallel linkage, and a rail 285 which places the jaw actuating pressure upon roller 277 is pivotally connected to the bell-cranks 282 and 283 at 286 and 287, respectively.

Reciprocation of the jaws 223 and movement of the jaw actuating assembly 278 is produced by means of appropriate cams mounted upon a cam shaft 288 which is rotatably mounted in bushings 289 and 290 supported, respectively in structural plates 226 and 227. A sprocket 291 mounted on main input shaft 234 carries a roller chain 292 which is also trained around an input sprocket 293 on the cam shaft 288, to drive the cam shaft from said input shaft.

Reciprocation of carriage 223 is caused by a pair of conjugate cams 294 and 295 on cam shaft 288, together with a bell-crank cam follower 296 which is pivoted at 297 and has cam followers 298 and 299 on its two arms bearing, respectively upon the conjugate cams 294 and 295. A large rocker arm 300, the lower end of which is pivoted on a shaft 301, carries a laterally extending boss 302 affording a pivotal connection for a link 303, the other end of which is pivotally connected to the upper end of cam follower bell-crank 296 at 304. A pin 305 mounted on the upper end of bifurcated rocker arm 300 provides a pivotal connection for a drive link 306, the forward end of which is connected to a pivot pin 307 in a depending bifurcated boss 308 in the body 265 of reciprocating clamp carriage 223.

It is apparent from the foregoing description that rotation of the conjugate cams 294 and 295 causes controlled rocking movement of bell-crank cam follower arm 266 as indicated by the solid and broken line showings of said bell-crank in FIG. 7, and this rocks the bifurcated rocker arm 300 which serves as a motion multiplying device to give a relatively long throw to the reciprocating clamps 223.

A jaw control cam 309 which is also mounted on cam shaft 288 acts through a cam follower roller 310 on a follower arm 311 which is pivotally mounted on a stud 312 extending inwardly from structural side plate 226.

Movement of the follower arm 311 is transmitted through an upright link 313 the lower end of which is pivoted at 314 to the arm 311 and the upper end of which is pivoted at 315 to rearwardly extending boss on the bell-crank 223 of the clamp actuating assembly 278.

The parallel linkage is over-balanced forward of the bell-crank pivots 280 and 281, so that the rail 285 is supported upon clamp actuating roller 277, and the spring 225a is strong enough to hold the parallel linkage up and act as a cam follower spring holding the cam follower 310 against the cam 309. The lobe of cam 309 elevates the link 313 to rock the cranks counterclockwise against the resistance of spring 225a and thus open the jaws.

The rack loading transfer means and its drive are best seen in FIGS. 10–13, 22a and 22b, and 23a and 23b. As previously pointed out, the sprocket 245 on output shaft 244 of the gear box 243 (FIGS. 10, 12 and 13) provides the drive for the rack loading transfer means, and this drive is best seen in FIGS. 10–13. Referring first to FIGS. 10 and 12, an eccentric shaft 316 is journalled in front and rear structural plates 232 and 233 and extends forwardly through the plate 232 to receive twin sprockets 317 for dual drive chains 318 which are also trained around the output sprockets 245 of gear box 243. A stud 318a mounted in plate 232 journals a tensioning sprocket 318b for drive chain 318. Mounted inwardly of the structural plates 232 and 233 upon eccentric shaft 316 are a pair of rack transfer control eccentrics 319 and 320 which are best seen in FIG. 12 to be 180° out of phase with one another. Rotatably surrounding the eccentrics are collars 321 and 322 and extending upwardly from said collars are links 323 and 324, respectively. As best seen in FIG. 10, the upper ends of the links 323 and 324 are pivotally connected to arms of bifurcated bell-cranks 325 and 326, respectively, said bell-cranks being journalled on a shaft 327 that is mounted in the front and rear structural plates 232 and 233. Thus, the rotation of eccentrics 319 and 320 rocks the bell-cranks 325 and 326, and since the eccentrics are out of phase with one another, the bell-crank 325 is at the extreme right-hand end of its travel, as seen in FIG. 10, when the bell-crank 326 is at the extreme left-hand end of its travel.

At the upper ends of the bell-cranks 325 and 326 are pivot bosses 328 and 329, respectively, and journalled in said bosses are pins 330 and 331 on the inner ends of which rack pulling pawls 332 and 333 are respectively mounted. At the outer ends of pivot pins 330 and 331 are fixed pawl spring arms 334 and 335, respectively, from which pawl tension springs 336 and 337 are connected, respectively, to spring studs 338 and 339 on the bifurcated bell-cranks 325 and 326. The transfer pawls 332 and 333 are seen in FIG. 12 to be positioned between the rack carrier rails 60a and 61a and the vertical flanges of the rack side frame members 90, and accordingly said pawls are in position to engage the laterally projecting heads of the cross-pins 91 of the racks R as illustrated in FIGURE 10. Thus, the transfer pawls 332 and 333 pull alternately on the projecting heads of the cross-pins 91, at the two sides of the rack R, so as to move the racks stepwise through the loading station. Each of the pawls has an inclined outer end, as exemplified by the end 332a of the pawl 332, so that each pawl rides under a pin 91 in ratchet fashion when the other pawl is pulling the rack.

When an empty rack Re is deposited in the infeed end 63 of the loading station B1, its forward end is not within reach of the pawls 332 and 333; and accordingly, a preliminary transfer means must be provided to advance each rack until it may be engaged by the pawls 332 and 333. This apparatus is best seen in FIGS. 22a and 23a, to include brackets 340 and 341 which are bolted, respectively, to the supporting rails 60a and 61a in the infeed end 62 of the loading station B1. A rock shaft 342 is journalled in the lower ends of the brackets 340 and 341, and at the two ends of the rock shaft are preliminary puller assemblies, one of which is indicated generally at 343. As a matter of convenience, the similar assembly adjacent the supporting rail 61a is not illustrated in FIG. 22a.

The assembly 343 includes an upright arm 344 which is clamped to rock shaft 342, and a long actuating rod 345 which has one end pivotally connected to a stud 346 on the bell-crank 325 for pawl 332 has its other end pivotally connected to a stud 347 which is adjustably mounted in a slot 348 of upright arm 344. Thus, the arm 344 reciprocates with the bell-crank 325. At the upper end of arm 344 is a rocking pin 349 which extends inwardly through a slot 350 in the side rail 60a, and on the inner end of rocking pin 349 is a pusher arm 351 at the front of which is a notch 352 to engage the projecting head of a cross pin 91 on a rack Re. On the outer end of rocking pin 349 is clamped a spring arm 353 from which a tension spring 354 extends to a spring stud 355 on the upright arm 354. Thus, the spring 354 urges the pusher arm 351 upwardly into engagement with a cross pin 91 on a rack, so that upon counterclockwise rotation of the arm 354 the pusher 351 moves the rack toward pawls 332 and 333. On return movement of the upright arm 344 the pusher arm 351 ratchets underneath any pins 91 which happen to be positioned above it. The length of the arm 344 is such as to give the pusher arm 351 a considerably longer throw than that of pawls 332 and 333, so that preliminary movement of the rack is approximately double the stepwise movement that occurs when the rack is being fed past the loading point.

The mechanism as described up to this point provides for the stepwise movement of the rack through the loading station, and also provides for the feed of packs P into the loading station in timed relationship with the stepwise movement of the racks. At the same time, it is necessary that the particular rack jaw 92 which is at the loading point be opened to receive the pack P from the reciprocating clamp 223, and for this purpose a cam mechanism, indicated generally at 356, is provided (see FIGS. 10 and 12). A cam shaft 357 is journalled at the extreme upper ends of the front and rear structural plates 232 and 233, and keyed to the cam shaft just inside the plate 233 is a sprocket 358 which receives a drive chain 359 the lower end of which is trained around a sprocket 360 on the eccentric shaft 316. A stud 361 which extends inwardly from the rear structural plate 233 supports an idler sprocket 362 for tensioning the chain 359.

Journalled on a cross bar 363 adjacent cam shaft 357 is a jaw actuating arm 364 the outer end of which is positioned to bear upon the actuating pad 96 of the jaw 92 which is located at the loading position. The actuating arm 364 is one arm of a bell-crank, the opposite arm 365 of which carries a cam follower roller 366 that bears upon a cam 367 on the cam shaft 357. Clamped on cross bar 363 is a bracket 368 that supports a cam follower compression spring 369, the upper end of which bears upon a laterally extending finger 370 on the jaw actuating arm 364 so as to urge the follower roller 366 against the cam 367.

The cam 367 is so shaped and its rotation is so timed that it moves the jaw actuating arm 364 downwardly against the actuating pad 96 as the rack stops with a set of jaws 92 at the loading position, holds the jaws 92 open util the reciprocating clamps 223 feed a pack into the jaws, and releases the arm 364 to close the jaws 92 on the pack P before the clamps 223 are opened and before the rack makes another step forward in the loading station. Comparison of the position of the clamp member 225 in FIG. 5 and of the jaw 92 in FIG. 12 shows that the clamp grips the lower portion of the pack while the jaw grips the upper marginal portion of the pack; and because the clamps must be positioned so low, the pack loading mechanism N includes guide rails 371 and 372 flanking a pack P and having their inner ends just clearing the end of the jaw 92 at the loading position.

As previously pointed out, it is necessary that the stepwise movement of a rack through the loading station be suspended whenever a pack is missing from the series carried by the conveyor chains 219, and this control is accomplished by the apparatus illustrated in FIG. 11, and indicated generally by the reference numeral 373. In general terms, the mechanism 373 comprises a mechanical clutch and brake device, indicated generally at 374, which is operated by a linkage, indicated generally at 375, from a solenoid 376 the energizing circuit of which is controlled by a pair of sensing switches 377 and 378 (FIG. 5) which are associated with the reciprocating pack clamp 223. The sensing switches 377 and 378 are normally closed switches which are connected in series in the solenoid controlled circuit, so that both switches must be closed in order to energize the solenoid. The switches 377 and 378 are provided, respectively, with pack sensing feelers 377a and 378a, and as long as one of the feelers is in contact with a pack P, it holds the associated switch open. If a pack is missing from the series in the gatherer conveyor a4, neither the feeler 377a nor the feeler 378a is in contact with a pack, and the result is that the switches 377 and 378 are both closed and the solenoid is energized.

In normal operation, the linkage 375 holds a clutch in the assembly 374 in driving engagement with the shaft 316 and holds a brake of said assembly out of braking engagement. When absence of a pack P from the series energizes the solenoid 376 it operates through the linkage 375 to disengage the clutch and set the brake, thus immediately stopping the rotation of shaft 316.

*Detailed description of the full rack storage and forwarding means D–1*

The full rack storage and forwarding means D–1 is best seen in FIGS. 3, 4, 25 and 26. The operation of the power and free conveyor of the storage and forwarding means D–1 and the storage and return means B–1 is illustrated in FIGS. 24 and 24a. As best seen in FIG. 3, the full rack receiving mechanism, indicated generally at 75, includes a pair of parallel angle members 400 and 401 providing receiving rails upon which a full rack RF is deposited by the rack elevating arms 59. The relationship between the receiving rails 400 and 401 and the elevating arms 59 is such that when the arms are vertical, the supporting rollers 99b of a rack supported on rack carrier 202a or 202b just clear the horizontal rack supporting webs of the rails 400 and 401, and as the arms continue their rotation the rack is left in the receiving mechanism with the rollers 99b resting upon the webs of the rails.

The hydraulic ram 76, which is seen to be suspended from top deck channel 55 on a bracket 76a, is seen in FIG. 4 to be in the same plane with the rack Rf supported on the rails 400 and 401, and its purpose is to push a rack off the rails 400 and 401 and onto the storage and forwarding rails 70 where the racks are in the grip of the power and free conveyor 72. It is necessary, of course, that the operation of the hydraulic ram be delayed until the rack carrier 202a or 202b is completely clear of the rack, and accordingly a contact switch CS9 (FIG. 36), which controls actuation of the hydraulic ram 76, is mounted in a suitable position on one of the supporting channels 58 where it may be closed by a suitably positioned contact finger on one of the arms 201 of the elevating arms 59.

It has been heretofore stated that the switch LS6 and LS8 of the control circuit for the rack handling clutch and brake unit 117, and also the contact switch 9 for the hydraulic ram 76, are all mounted upon the supporting channels 58 for actuation by suitably positioned actuating elements mounted upon the arms 201. However, it will be obvious to one skilled in the art that a line of switch actuating cams having suitably positioned switch actuating lobes may be mounted upon the cam shaft 357, or upon other cam shafts, so as to operate switches LS6, LS8 and CS9 mounted upon a bracket adjacent the cam shaft.

Referring again to FIG. 3, and also to FIG. 24, the power and free conveyor 72 is seen to include a shaft 402 supported on longitudinal brackets 403 and 404 and carrying an idler sprocket 405 for one end of a conveyor chain 406, the opposite end of which is trained over a sprocket 407 on an input shaft 408 which is journalled in brackets 409 and 410 adjacent the unloading station E1. Drive for the chain 406 is through a sprocket 411 on shaft 408 around which is trained a chain 412 that also passes around a sprocket 412a on an output shaft of the speed reducer 74.

As best seen in FIGS. 24 and 24a, the power and free conveyor 72 includes a box-like track 413 with a longitudinal central slot 414 on the bottom, and the chain 406 is provided with transverse pins on opposite ends of which are mounted supporting wheels 415 which ride in the track flanking the slit 414 so as to positively support the chain 406. At intervals along the chain 406 are spaced depending lugs 416, and carried upon said lugs are the power and free conveyor members, indicated generally at 417, which push each of the racks until it is about to collide with the next preceding rack and then free the rack until the next preceding rack is again moved forward. The conveyor member 414 includes a disconnect finger 418 which is pivoted between the bosses 416 at 419 and have a forward contact roller 420 which is behind an inclined surface 421. A driving dog 422, pivoted at 423 in the rear portions of bosses 416, has a concave surface 424 which is an arc struck about the disconnect finger pivot 419; and a rear arcuate surface 425 of finger 418, complementary to the surface 424, bears upon surface 424 when the disconnect finger is in the full line position of FIG. 24 to hold the driving dog rigidly for driving engagement with the drive lugs 101 or 102 on a rack R.

When the finger has its forward end elevated to the dotted line position of FIG. 24 by impingement of the inclined nose 421 and roller 420 upon the side frame 90 of a preceding rack, the arcuate surface 425 at the rear of the finger swings downwardly out of contact with the complementary surface 424 of the driving dog so the dog swings freely in a clockwise direction when it strikes the drive lugs 101 or 102 on a rack. Thereupon the power and free conveyor dog assembly 417 moves without exerting any further driving force on the rack R. When the next preceding rack is moved away by engagement of a driving dog with it, the rack R may be engaged by the next conveyor member 414 and moved forward until it is again immediately adjacent a preceding rack, a pin 426 prevents the rear of finger 419 from swinging too far up.

The guide rails 100a in FIG. 24 receive the guide rollers 100 of a rack R.

Referring now to FIGS. 3 and 26, the escapement mechanism 77 for releasing the full racks Rf one at a time into the racks positioning rail sections 78, includes an inclined track section 427 down which a rack may roll onto the positioning rail sections 78. The escapement mechanism 77 includes a primary escapement member, indicated generally at 428, and a secondary escapement member, indicated generally at 429, both of which are actuated by a control cam means indicated generally at 430. The parts of the primary escapement member 428 include a bracket 431 mounted upon track supporting means 71, and a bell-crank 432, pivoted upon said bracket at 433, has an arm 434 which has an escapement head 435. The shape of the head 435 is seen in FIG. 18, which illustrates an identical head 674 of the rack return escapement 69. The surface 674a of the head 674 is specially shaped to engage the two upstanding escapement pins 101 or 102 on a rack R. A tie rod 437 which is pivoted to the upper end of bell crank 432 has an end pivotally connected at 438 to a cam follower arm 439 that is pivoted at 440 on a bracket and has a cam follower roller 441 bearing upon a cam element 430a of the cam unit 430. A cam follower spring 442 connected to the arm 439 holds the follower roller 441 against the cam element 430a Similarly, the escapement assembly 429 includes a bracket having a pivot 443 for an escapement arm 444, and the arm 444 has an escapement head 445 exactly like the head 435 on arm 434. A link 446 connects said arm to one end of a cam follower lever 447 that is clamped to a rock shaft 448 and has a follower roller 449 bearing upon a cam element 430b of the cam unit 430. A cam follower spring 450 connected to the follower arm 447 pulls the roller 449 against the cam element 430b.

The distance from escapement head 435 to escapement head 445 is about two inches less than the distance from the escapement pins 101 on one rack to the corresponding pins on the next preceding rack. Thus, when a first rack is held by head 445, as seen in FIG. 26, the next rack abuts said rack, and escapement head 435 is about two inches ahead of the pins 101 on said next rack. Elevation of escapement arm 444 to release the first rack allows the next rack to roll against escapement head 435, which holds said next rack until escapement arm 444 is again lowered. Arm 434 is then raised to permit said next rack to move up into abutment with head 445, and promtply lowered, and still another rack may be moved up by the power and free conveyor to abut said next rack.

It will be recalled that the rack return escapement mechanism 69, which has not yet been described in detail, is operated from the rack handling drive K so that it is in timed relationship with the rotation of the rack lowering arms 57. Similarly, as will be described in more detail hereafter, the cam unit 430 for the escapement mechanism 77 is driven through a rack handling power train, indicated generally at 452 in FIG. 25, which also drives the full rack lowering arm 79 and the empty rack elevating arms 85 of the unloading station E1.

There is also a rack locating means (not shown), similar to that in the rack positioning mechanism O, to precisely locate racks for pick-up by the rack lowering arms.

*Detailed description of drive system for escapement 77, full rack lowering arms 79, empty rack elevating arms 84, full rack transfer mechanism 81, unloading means F–1, belt unit 87 and rotary head 88.*

FIG. 38 is a diagrammatic view of the entire power transmission system for the above identified components, and may be correlated with the various parts of said power transmission system which are also illustrated in FIGS. 25 and 29–35 inclusive.

As previously stated, coordination of all of the unloading components with the binder J makes it desirable to drive all said components from the same motor that drives the binder. Accordingly, a line shaft 453 extends from the binder continuously parallel to the pack conveyor H and past the unloading stations E–1, E–2, and E–3 to provide power for all the components of all three stations. A large serrated time pulley 454 is mounted on the line shaft 453, and a jack shaft 455 for driving the belt unit 87 and rotating head 88 carries a similar pulley 456, and a tooth timer belt 457 is trained around the pulleys 454 and 456. As seen in FIGS. 38 and 29 and 33, a pair of sprockets 458 and 459 on the jack shaft 455 provide a power take-off for the two sides of belt unit 87, while the rotating turret 88 is driven from a sprocket 460 on the jack shaft.

The gear shift 89, previously referred to, includes a pair of input gears 461 and 462 of different sizes on the line shaft 453, and output gears 463 and 464 on a sliding shaft 465 by means of which the gear 463 is in mesh with gear 461, as illustrated, or the gear 464 may mesh with the gear 462 to provide a rate of rotation of the sliding shaft 465 which is one-half that in the first arrangement. Slidably keyed to the shaft 465 is a sprocket 466 from which a chain 467 is trained around a sprocket 468 on an intermediate distributor shaft 469. A sprocket 470 on the distributor shaft 469 provides the power input for the rack handling drive 452, a second sprocket 471 on the distributor shaft 469 provides the power input for the rack unloading transfer means 81 (see FIG. 32) while a third sprocket 472 on the distributor shaft 469 provides the power input for the rack unloading apparatus F1.

Referring now to FIG. 25, the rack handling power train 452 includes a bottom shaft 473 which is journalled on brackets 474 and 475 and carries a sprocket 476 which is aligned with the sprocket 470 on shaft 469 to receive a roller chain 477 which is trained over said sprocket 470.

The shaft 473 drives a miter gear box 478 which is also mounted on the bracket 475, and from the miter gear box 478 an upright shaft 479 at the outfeed end of the unloading station E1 in turn drives a miter gear box 480 at the top of the unloading station; and an upper horizontal shaft 481 from miter box 480 drives a gear box 482. The gear box 482 has a first shaft 483 the outer end of which carries the cam unit 430 of the escapement mechanism 77. A second output shaft 484 of gear box 482 carries a sprocket 485 from which the full rack lowering arms 79 and empty rack elevating arms 84 are driven (see FIGS. 27 and 28).

Figure 32:
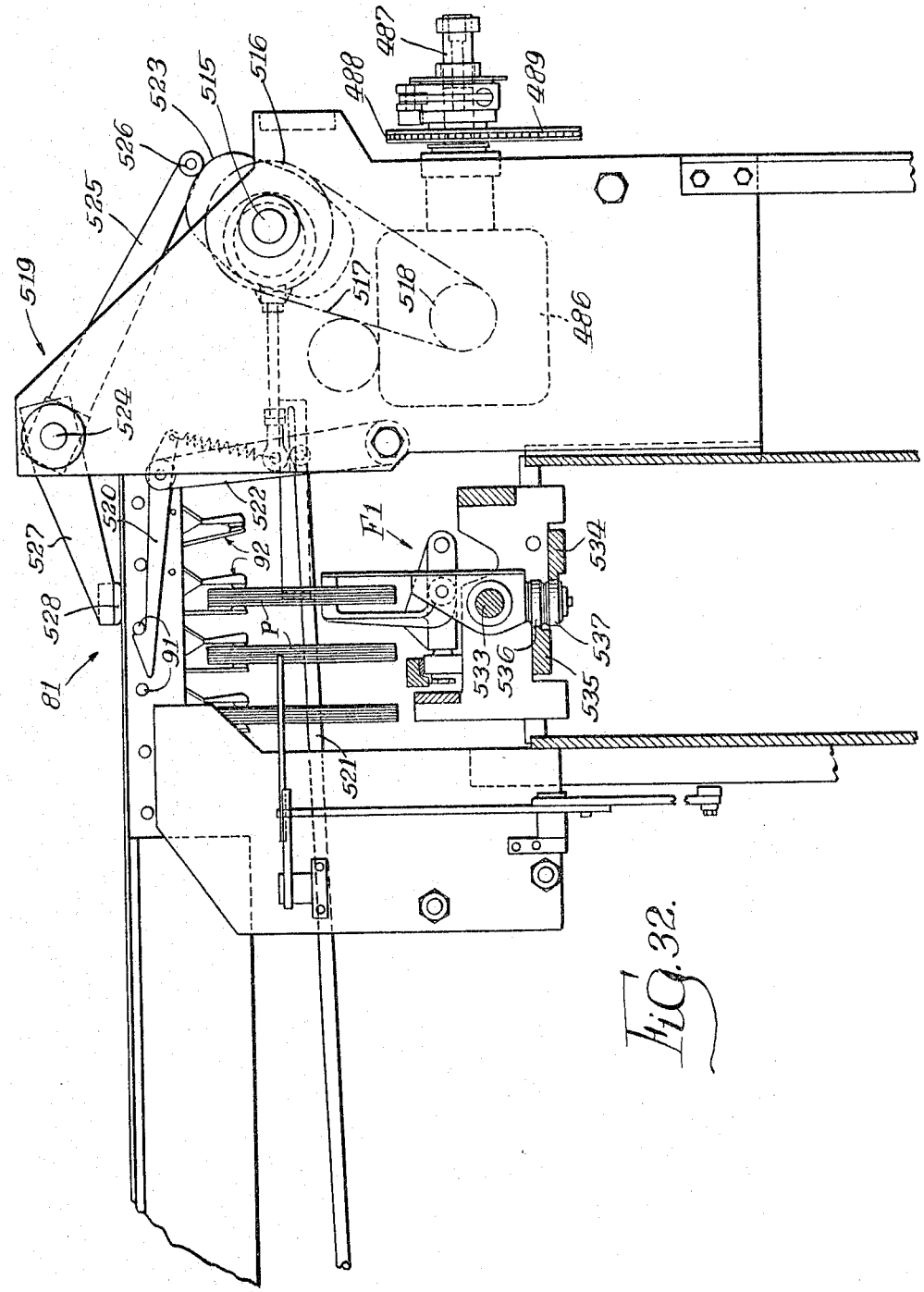
FIG. 32 is a fragmentary section on an enlarged scale taken substantially as illustrated along the line 32—32 of FIG. 29.

As best seen in FIG. 32, a gear box 486 provides the power input for the rack unloading transfer means 81 and has an input shaft 487 carrying a sprocket 488 for a chain 489 which is also trained around sprocket 471 on distributor shaft 469.

Figure 31:
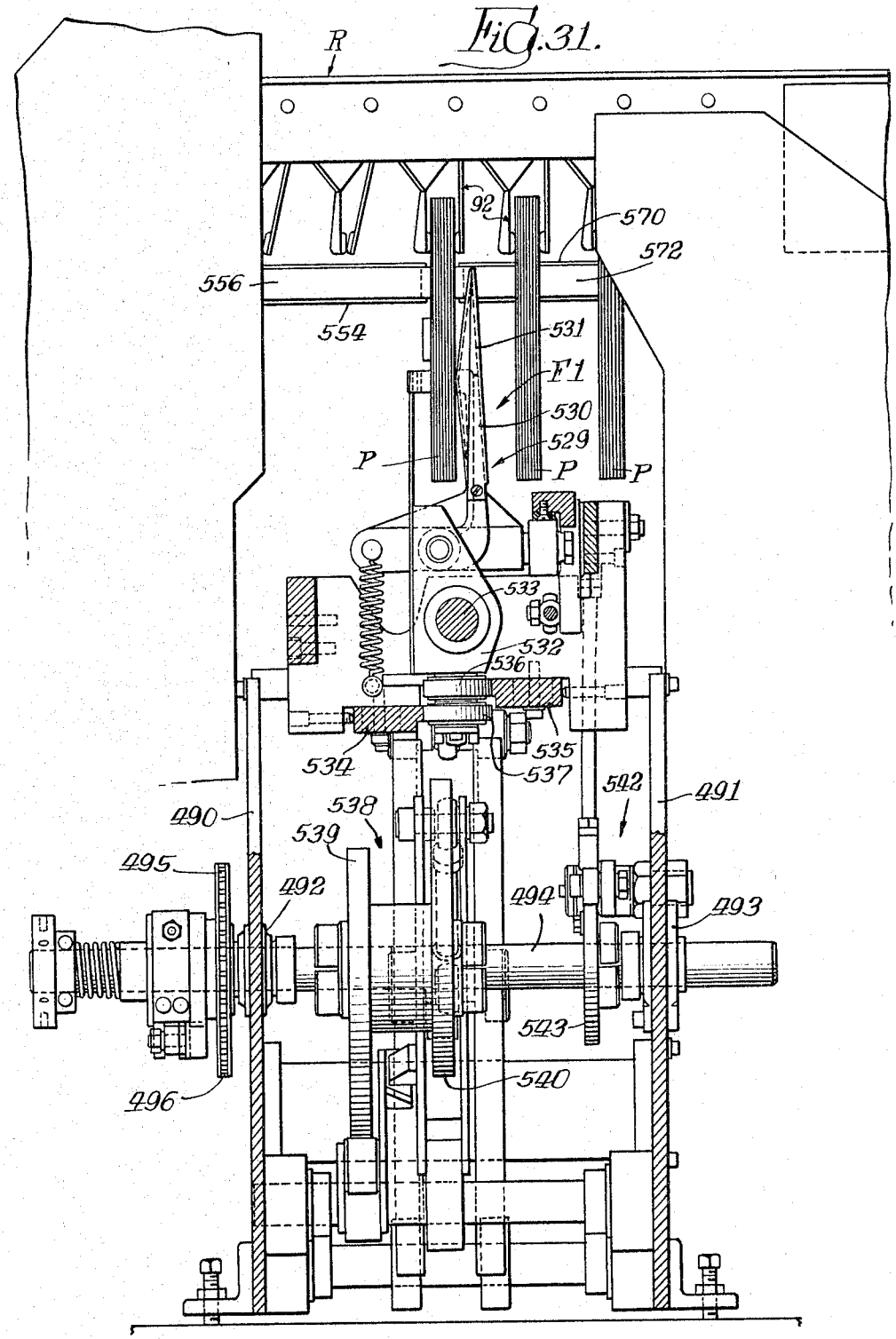
FIG. 31 is a fragmentary section on an enlarged scale taken substantially as illustrated along the line 31—31 of FIG. 30.

As best seen in FIGS. 30 and 31, a pair of supporting plates 490 and 491 carry bushings 492 and 493 in which a cam shaft 494 of the unloading means F–1 is journalled, and a sprocket 495 on said cam shaft carries a roller chain 496 which is also trained around the sprocket 472 of distributor shaft 469.

*Detailed description of unloading station E–1, full rack lowering arms 79, empty rack elevating arms 84, rack unloading transfer means 81, and rack unloading mechanism F–1*

All of the major components which are described in detail at this point are illustrated in FIGS. 25 and 28 to 32. The components will be described in relatively general terms, because except for the drive, which has already been traced in detail, these components are substantially identical with those in the loading station B–1, and both the operating mechanisms and the modes of operation are the same.

Referring first to FIG. 28, the rack lowering arms 79 include a rotating supporting shaft 497 and parallel arms 498 at the ends of which are rack carriers 499a and 499b. Rack carrier orienting means, indicating generally at 500, maintains the rack carriers 499a and 499b in a horizontal position as the arms 498 rotate. The rack carriers 499a and 499b are provided, respectively, with rack supporting latch means 501a and 501b, upon which the rack flanges 90a are supported as a rack is lowered on the arms 79.

Similarly, the rack elevating arms 84 include a rotating shaft 502, parallel arms 503 on the shaft, and rack carriers 504a and 504b which are maintained in a horizontal orientation as the arms rotate by orienting means, included generally at 505, which is identical with the orienting means 500. The rack carriers 504a and 504b also have rack supporting latches (not shown) upon which the flanges of an empty rack are supported.

A drive shaft 506 for the lowering arms 79 and elevating arms 84 carries a sprocket 507 from which a chain 508 is trained around the sprocket 485 on output shaft 484 of the gear box 482. On the right-hand end of the shaft 506, as viewed in FIG. 28, is a sprocket 509 for a drive chain 510 which is trained around a sprocket 511 on the rotating shaft 497 of the rack lowering arms 79; while at the left-hand end of the shaft 506, as viewed in FIG. 28, is a sprocket 512 for a drive chain 513 which is trained around a sprocket 514 on the rotating shaft 502 of the rack elevating arms 84.

Referring now to FIG. 32, an eccentric shaft 515 for rack unloading transfer means 81 carries a sprocket 516 for a drive chain 517 which is also trained over a sprocket 518 of gear box 486 to drive the transfer means and operate a rack jaw actuating mechanism, indicated generally at 519.

The rack unloading transfer means 81 includes a pair of pawls, such as the pawl 520 in FIG. 32, which are reciprocated by a pair of eccentrics on shaft 515 which are 180° out of phase of one another so that the pawls pull alternately on the projecting ends of cross pins 91 at the two sides of rack R to advance the rack stepwise through the unloading station. A long connecting rod 521 links a rocker arm 522 for the pawl 520 to a pair of preliminary rack advancing hooks (not shown) which are identical to those heretofore described in conjunction with the loading station B–1.

The rack jaw actuating means 519 of the unloading station differs from the jaw actuating means at the loading station in that an operating cam 523 for the rack actuating means is mounted directly upon the eccentric shaft 515 (instead of on a separate cam shaft driven from an eccentric shaft), and a rock shaft 524 carries a follower arm 525 with a follower roller 526 bearing on cam 523, and also carries a jaw actuating arm 527 having a bearing pad 528 which bears upon the bearing pads 96 of the rack jaws 92 to open said jaws and release a pack of signatures to be picked up by the unloading means F–1.

Referring now to FIGS. 30 and 31, the unloading means F–1 is substantially identical with the loading means N, and includes reciprocating clamp means 529 which is substantially identical with the clamp means 223 (FIG. 7) except that a movable clamp member 530 of the clamp means 529 has an inclined pack stabilizing arm 531 the upper end of which is seen to be only slightly below the lower margin of the rack jaws 92.

The reciprocating clamping means 529 includes a carriage 532 which is supported upon a rod 533 and stabilized between rails 534 and 535 by means of rollers 536 and 537; and the carriage 532 is reciprocated by a conjugate cam and link apparatus, indicated generally at 538 which has conjugate cams 539 and 540 mounted upon cam shaft 494, and an operating linkage, indicated generally at 541, for reciprocating the carriage 532.

Opening and closing of the clamp means is controlled by a cam and link mechanism, indicated generally at 542, which includes a control cam 543 on the cam shaft 494, and a connecting linkage 544 for rocking a parallelogram type linkage, indicated generally at 545, which operatively engages a portion of the movable clamp member 530 to open and close the clamps.

*Detailed description of rack feeding means G-1, including belt unit 87 and rotating head 88, and pack conveyor belt H.*

The conveyor feeder G-1, including both the belt unit 87 and rotating head 88, are best seen in FIGS. 33 to 35, and since no similar mechanism is found at the loading station B-1, these components will be described in detail. Details of the pack conveyor H are seen only in FIG. 35.

Referring first to FIGS. 33 and 35, the belt unit 87 is seen to include a platform 546 and a platform 547 which are mounted upon suitable brackets 548 and 549, and there is a pack receiving slot 550 between said platforms which is aligned with the unloading position 83 and with the reciprocating clamps 529. Cooperating belt means, indicated generally at 551 and 552, are mounted, respectively, upon the platforms 546 and 547. The belt means 551 includes a fixed drive pulley 553 on an input shaft 553a, an adjustable pulley 554 and a removable pulley 555. The three pulleys are serrated to receive a timer belt 556 which has a straight run along one side of slot 550 where it is backed up by a guide plate 557 which is carried on brackets 558 on the platform 546. A gear box 559 mounted on bracket 548 has an input shaft 560 provided with an input sprocket 561 to receive a chain 562 which is trained around sprocket 458 on jack shaft 455. An upstanding output shaft 563 on gear box 559 extends through platform 546 and carries a serrated pulley 564; and a toothed drive belt 565 is wrapped around the pulley 564, passes outside an idler pulley 566, around an input sprocket 567 on the input shaft 553a, and is back wrapped around an adjustable tensioning pulley 568 which is also supported upon platform 546.

The belt means 552 is similar to the belt means 551, and includes a fixed drive pulley 569 on an input shaft 569a, an adjustable pulley 570, and a removable pulley 571, with a timer belt 572 trained around said three pulleys and having a straight run along the opposite side of slot 550 from the straight run of belt 556. In said straight run the belt 556 is backed up by a guide plate 573 which is carried on brackets 574 on the platform 547.

The drive for belt means 552 is derived from a gear box 575 which is mounted upon the bracket 549, and the gear box 575 has an input shaft 577 provided with a sprocket 578 for a drive chain 579 which is trained around the sprocket 459 on the jack shaft 455. An upright output shaft 580 on the gear box 575 extends upwardly through platform 547 and carries a serrated pulley 581 from which a timer belt 582 is wrapped around a serrated pulley 583 on the input shaft 569a. The timer belt 582 also back wraps an adjustable tensioning pulley 584.

As shown by the solid and broken line showings of the reciprocating clamps 529 in FIG. 30, the clamps take packs P from between the jaws 92 of a rack R and deliver the packs to the slot 550 where they are picked up by the parallel runs of the belts 556 and 572 for delivery to the rotating head 88.

Referring more particularly to FIGS. 33 to 35, the rotating head 88 includes a platform 586 which is mounted upon legs 587 having out-turned lower ends that are slotted so that the platform 586 may be adjusted normal to the line of the pack conveyor H.

Referring now particularly to FIG. 34, in the center of platform 586 is a bearing well 588 which rotatably receives the lower end of a hollow rotary hub 589 on which are mounted eight identical radially extending arm assemblies, each indicated generally at 590. The drive for the hub 589 is from a bevel gear box 591 which is mounted beneath platform 586 and has an input shaft 592 mounting a sprocket 593 on which a roller chain 594 is trained to drive the bevel gear box 591 from sprocket 460 on the jack shaft 465. Bevel gear box 591 has an output shaft 595 which projects upwardly through platform 586, and a sprocket 596 on said output shaft carries a drive chain 597 which also wraps a drive sprocket 598 on the hub 589. An adjustable tensioning sprocket 599 maintains tension in the chain 597.

As best seen in FIG. 34, each of the arm members 590 includes a channel-like base member 600 having a mounting web 601 bolted to the hub 589, and the channel has a base 602 beneath which a lower jaw member 603 is slidably mounted in hanger brackets. Lower jaw member 603 has a depending spring stud 604 from which a tension spring 605 is connected to a fixed spring stud 606 which extends downwardly from the base 602 of the channel member, so that the slidable lower jaw member 603 is constantly urged outwardly with respect to the hub 589. At the outer end of sliding jaw member 603 is a depending jaw plate 607 the lower margin of which carries a pack gripping bead 608.

A cross pin 609a mounted between the upright sides of the channel member 600 mounts a bell crank, indicated generally at 609, one arm 610 of which extends outwardly above the base 602 of the channel. At the outer end of arm 610 is a depending jaw member 611 at the lower end of which is a round bar 612 which, under certain circumstances, is directly opposite the bead 608 on the jaw plate 607 (see left-hand jaw in FIG. 34 and FIG. 35) so as to grip the upper marginal portion of a pack P between the bead 608 and the bar 612. The bell crank 609 also has an upright arm 613 in spaced relationship to the mounting web 601 of the channel member 600, and a back plate 614 in said arm mounts a bracket 615 for a stud 616 on which a cam follower roller 617 is journalled. Back plate 614 is apertured so that a mounting bolt 618 for a cam follower spring 619 may extend through the aperture and screw into the mounting web 601.

As best seen in FIG. 34, within the hollow hub 589 is an upright fixed spindle 620 that carries a cam plate 621 against which all the cam follower rollers 617 are urged by their respective follower springs 619. As seen in FIGS. 33 and 35, as the head 88 rotates its arms 590 pass successively over the slot 550 between the belts 556 and 572, and as seen in FIG. 35, 90° later each arm is directly above the pack conveyor H.

During approximately 270° of rotation of the rotating head 88, the bell cranks 609 occupy the elevated position seen to the right in FIG. 34; and during this time the cam follower rollers 617 are bearing upon an idle surface 622 of the cam plate 621. A lobe 623 of greater radius than cam surface 622 has a sharply inclined entry shoulder 624 and a sharply inclined exit shoulder 625 which are so positioned that the bell cranks 609 are pivoted to pack gripping positions as each arm is extending to the right, as seen in FIG. 33, and return to free position 90° later above the pack conveyor H.

In order to effect clean pick-up and release of a pack P, without danger of rumpling the signatures, it is necessary that the sliding lower jaw plate 603 be retracted immediately before a pack is gripped, and that it be permitted to slide outwardly to grip the pack against the bar 612 on jaw 611 after said jaw has reached its fully lowered, pack engaging position. Similarly, at the pack release point above the conveyor H, the sliding lower jaw plate 603 must be retracted to release the grip on the signature pack P before the arms 610 are elevated. To accomplish this, a pair of fixed bar cams 626 and 627 (FIGS. 34 and 35, respectively) surmount platform 586 on brackets 628 and 629, respectively, and a cam follower roller 630 at the inner end of each sliding lower jaw bar 603 is positioned to bear upon control cam surfaces 631 and 632 of the respective bar cams 626 and 627. It is apparent from examination of FIGURE 33, that a follower roller 630 rotates into contact with cam surface 631 so as to gradually retract the lower jaw plate 603, and that as the follower 630 rolls along the irregularly curved cam surface to the portions which are radially more distant from the center of hub 589, the jaw plate is returned toward its normal position by the spring 605. Since the normal position of the bar 608 is in contact with bar 612 on the jaw 611, the spring 605 causes a pack P to be gripped firmly between the bead 608 and the bar 612. Conversely, as the cam roller 630 rotates into contact with the cam surface 632, the sliding lower jaw plate 603 is gradually retracted to release the pack P over the pack conveyor H, and as the rotation continues the follower roller 630 moves slowly off the cam surface 632 so as to return the sliding jaw plate 603 gently to its normal position.

Referring now to FIG. 35, the pack conveyor H has a fixed, pack supporting rail 633 which is inclined outwardly about 15° from the horizontal, and a pack conveyor chain 634 carries a succession of closely spaced pack supporting plates 635 which are perpendicular to the base rails 633, and thus inclined outwardly about 15° from the vertical. At the margin of the base rail 633 which is toward the rotating head 88 is a continuous angle member 636 forming a retaining ledge for the lower end of a pack of signatures. As the pack is released by the motion of sliding lower jaw plates 603 and bell crank 609, it drops against the supporting plates 635 so as to recline at about a 15° angle to the vertical as it is carried toward the binder J by the conveyor H. Mounted on the plates 635 are laterally extending pack pushing rods 637 which maintain the proper spacing between the packs as they move toward the binder.

*Shifting the apparatus from two-up pack delivery to one-up pack delivery*

In the general description of the entire apparatus it was pointed out that one of the great advantages of the present system is the flexibility which it permits, due to the alternate modes of operation, with "one-up" delivery or "two-up" delivery of packs to the conveyor H.

In going from two-up delivery to one-up delivery, several minor modifications must be made. In the first place, the gear shift is moved so that the slidable shaft 465 is driven at one-half the rate of speed that it has for two-up delivery. This causes one-half rate operation of the full rack escapement mechanism 77, of the full rack lowering arms 79 and the empty rack elevating arms 84, of the rack unloading transfer means 81 and of the unloading means F–1. On the other hand, the belt unit 87 and rotating head 88 are separately driven off the line shaft 453, and accordingly, they continue to operate at the full rate.

This means that packs P are delivered from the unloading station to the belt unit 87 at twice as long intervals, and also that in the absence of some adjustment there will be a differential between the rate of speed of reciprocating clamps 529 and that of the belts in the belt unit. The basic element which makes the adjustment possible is the design of the conjugate cams 539 and 540 which control the reciprocation of the clamps 529. The cams are so designed that, as seen in FIG. 39, a speed curve for the clamps starts at zero where the pack is picked up by the clamps, rises rapidly to a maximum speed, and then goes through two zones X and Y of approximately constant speed, with the speed in the zone X being double the speed in zone Y. Thus when the drive for the reciprocating clamps is operating at half speed, the actual rate of movement of the clamps is the same in the zone X as the actual rate of movement in the zone Y when the drive is operating at full speed. Accordingly, the belt unit must be adjusted so that, when the drive is operated at half speed the belt unit receives the signatures in the zone X, while in full speed operation of the drive the belt unit receives the signatures in the zone Y. By this means the pack of signatures is always transferred from the clamps 529 to the belt unit 87 at a time when both the clamp and the belts are traveling at the same rate of speed.

It will be recalled that pulleys 555 and 571 of the belt unit were described as removable pulleys; and they are, in the sense that their slotted mountings 555a and 571a permit them to be moved a sufficient distance laterally to free the respective belts 556 and 572 from them so that said belts extend directly from the fixed pulleys 553 and 569 to the adjustable pulleys 554 and 570, respectively. The pulley 554 is mounted directly upon an adjusting lever 638 which is pivoted at 639 and has a pin and slot guide means 640, so that the end of the lever carrying the pulley 554 may be moved farther from the pulley 553. Similarly, the adjustable pulley 570 is carried upon a slide bar 641, and the slide bar 641 in turn has one end pivotally mounted at 642 on an adjusting lever 643 which is pivoted at 644 on the platform 547 and has a pin and slot guide 645.

When the adjustable pulleys 554 and 570 are in the positions illustrated in FIG. 33, the belts 556 and 572 receive a pack from the reciprocating clamps 529 in the zone Y indicated on the speed curve FIG. 39; while the adjustment of the pulleys 554 and 570 just described causes the belts to receive a pack from the reciprocating clamps 529 in the zone X of the speed curve.

Because of the shift in the point at which the belts 556 and 572 receive a pack from the clamps 529, it is also necessary to adjust the point at which the clamps open to release the pack; and this is accomplished by rotating the jaw actuating control cam 543 a few degrees on the cam shaft 494 when the apparatus is shifted from two-up to one-up operation.

In view of the half speed operation of the rack handling and pack unloading means, the space between packs P in the belt unit is twice as great as that indicated in FIG. 33, so a pack is delivered by the belt unit only for every other arm 590 of the rotating head 88. Since the purpose of one-up delivery of packs is to deliver packs to the pack conveyor H alternately from the unit I and the unit II, when an arm 590 of the unit I which is carrying no pack swings into position over the pack conveyor H, its jaw 611 would interfere with the pack already deposited on the conveyor by the unit II if it were in pack gripping position. To avoid such interference, alternate arms 590 of the rotating head 88 are disabled by removing the cam follower rollers 617. This, of course, causes the bell cranks 609 from which the follower rollers 617 have been removed to remain in an elevated position where they do not interfere with the packs on the pack conveyor H.

The remaining adjustments necessary for one-up delivery of the packs to the pack conveyor H include bodily movement of the rotating head 88 toward the pack conveyor so that the arms 590 of the unit I will deposit the packs P with their lower ends against the bottoms of the supporting plates 635; and the angle member 636 is shifted toward the plates 635 so as to closely confine the packs. In the case of two-up delivery, the position of the rotating head 288 is such that the arms 590 of the unit I deliver packs P with their lower ends against the lower ends of the packs already delivered to the pack conveyor H by the unit II. In the case of three-up operation, packs from the unit III rest against the plates 635, packs from the unit II rest against the packs from the unit III, and packs from the unit I rest against packs from the unit II. In each case the angle member 636 is shifted to the position required by the total thickness of the packs being delivered by the conveyor H to the binder J.

*Detailed description of rack storage and return means C–1*

The rack storage and return means C–1 requires little detailed description beyond that already given, since, for the most part, its operation is the same as that of the rack storage and forwarding means B–1 already described in detail. Referring to FIGS. 15, 17, 18 and 27, the power and free conveyor 66 for the storage and return means C–1 has a drive shaft 646 which is mounted on brackets extending outwardly from the return deck plate 54, and an input sprocket 647 on the shaft 646 carries a drive chain 648 which is also trained around a sprocket 649 on an output shaft 650 of speed reducer 68. The speed reducer, in turn, has an input shaft 651 supporting a pulley 652 for a drive belt 653 by means of which the speed reducer is driven from an output pulley 654 on motor 67.

A drive sprocket 655 on power and free conveyor drive shaft 646 carries a conveyor chain 656, the opposite end of which is seen in FIG. 27 to be trained around a sprocket 657 journaled on a shaft 658 immediately adjacent the empty rack receiving means 85 at the top of unloading station E–1.

The construction of the power and free conveyor chain 656 is identical with that of the chain 406 in the rack storage and forwarding means D–1, and accordingly, it is not described in detail.

The rack receiving means 85 includes a pair of receiving rails 659 from which the empty racks are pushed onto the storage and return rails 64 and into the grip of power and free conveyor 66 by means of the hydraulic piston 86; and actuation of hydraulic piston 86 is controlled by the position of the empty rack elevating arms 84 in the same manner as heretofore described for the hydraulic piston 86 of the full rack storage and forwarding means D–1.

The escapement mechanism 69 for the empty rack storage and return means C–1 is seen in FIGS. 15, 17 and 18. While this mechanism differs mechanically from the escapement mechanism 77 of the storage and forwarding means D–1, the function is the same, and in fact a mechanism identical with the mechanical 77 may be substituted for the mechanism 69.

Referring to FIG. 15, the shaft 126 in the power train for the rack positioning mechanism O is seen to extend to the left outside its bearing block 127, and mounted on said shaft is a control cam 660 for the escapement mechanism. A rock shaft 661 is journaled on brackets 662 which project outwardly from one of the top deck channels 53, and a cam follower arm 663 clamped to the rock shaft has a follower roller 664 which bears upon the escapement control cam 660. Clamped onto the opposite end of rock shaft 661 is an arm 665 at the upper end of which is pivoted a link 666 which is also connected at 667 to the upper end of an escapement control arm 668. One of the supporting channels 65 for the storage and return rails 64 carries a bracket 669 projecting from which is a stud 670, and a hub 671 at the bottom of escapement control arm 668 is rotatable on the stud 670. Extending in opposite directions from hub 671 are first and second escapement arms 672 and 673, respectively, in the ends of which are escapement heads 674 and 675. As seen in FIG. 18, the escapement heads 674 and 675 are of different shapes, but each has a specially shaped engaging surface, numbered respectively 674a and 675a, which engage the escapement studs 102 (or 101) on a rack. As is clear from FIG. 18, the escapement head 674 on arm 672 may be positioned directly in the path of the rack escapement studs 102, while the escapement head 675 on the arm 673 must have a flange which extends over escapement studs 102, and the surface 675a extends downwardly from the flange.

The escapement 69 is seen with the arm 673 holding a first rack in readiness to enter the positioning mechanism 0 by contact of the head 675 with the studs on the trailing edge of the rack. A second rack is in contact with the first rack, the escapement arm 672 being elevated. When the escapement rocks clockwise the arm 673 releases the first rack, and the arm 672 moves down enough to catch the second rack by the studs on its trailing edge. The escapement then returns to its original position and the second rack rolls down the inclined escapement rails to be caught by the arm 673. A third rack may then be fed beneath the arm 672 and into contact with the trailing edge of the second rack.

Description of motor controls

It is clear from FIG. 37 that the motor controls are of the simplest type and this is possible because all of the motors operate continuously. The full rack forwarding motor 73, the empty rack return motor 67 and the rack handling motor 116 are all controlled from conventional starting relays each having a manual start button, a holding relay, and a manual stop button. Drive motor 239 which drives gatherer A–1, the gatherer of pack conveyor a–4, the reciprocating loading clamp, and the rack loading transfer drive, is controlled by a conventional start-stop pushbutton switch.

Since it is sometimes necessary after a shut-down to operate the rack handling motor 116 with manual control of the clutch-brake mechanism 117, a manual "run" button may be used to close a circuit which releases the brake and engages the clutch; and likewise, since it is sometimes desirable to be able to inch the lowering arms and elevating arms three "inch" buttons are mounted at various convenient locations about the loading station B–1, and similarly three stop buttons are located at various convenient points.

The foregoing detailed description is given for clearness of understanding only, and no unnecessary limitations are to be understood therefrom, for some modifications will be obvious to those skilled in the art.

I claim:

1. In apparatus for handling packs of printed signatures, in combination: a loading station; means for moving normally equally spaced packs of signatures in a stream end-to-end toward said loading station; a plurality of storage racks, each rack including a plurality of parallel sets of depending, normally closed signature pack gripping jaws; transfer means for moving an empty rack stepwise through said loading station across the end of said stream of signatures so as to align each set of jaws momentarily with said stream; means at the loading station for opening each set of jaws to receive a pack of signatures and for then releasing said jaws; reciprocating signature feed clamps for feeding a pack of signatures into the open set of jaws at the loading station; and means for opening and closing said clamps in timed relationship with the reciprocation of the clamps and the opening and closing of the jaws.

2. The apparatus of claim 1 which includes sensing means adjacent the feed clamps to detect the absence of a pack from the stream at the clamps, and means for suspending the stepwise movement of the rack at the loading station until a pack is in the feed clamps, whereby every set of jaws in the rack receives a pack.

3. The apparatus of claim 2 in which the sensing means includes an electrical switch, the transfer means includes a clutch and brake unit, and the means for suspending stepwise movement includes a solenoid controlled by said switch, said solenoid causing the release of said clutch and the setting of said brake in the absence of a pack in the feed clamps as they move toward the jaws.

4. The apparatus of claim 1 which includes rack storage and return means for supporting empty racks in an elevated position and moving them toward the loading station, rack storage and forwarding means for supporting full racks in an elevated position and moving them away from the loading station, means for lowering empty racks seriatim from the storage and return means into the transfer means, and means for raising full racks seriatim from the transfer means into the storage and forwarding means.

5. The apparatus of claim 4 in which the means for lowering empty racks and the means for raising full racks each includes arm means rotatably mounted on parallel horizontal axes, and in which means are provided for rotating said arm means in timed relationship.

6. The apparatus of claim 5 in which the means for rotating the arm means in timed relationship includes an electrical limit switch adjacent the loading station and positioned to be activated by the forward end of a full rack immediately after the rearmost jaws in the rack receive a pack, and arm drive means controlled by actuation of said switch to start rotation of said arms to pick up the full rack and move an empty rack to a ready position immediately above the rack at the loading station.

7. The apparatus of claim 6 which includes arm drive interrupting means for retaining the arms with an empty rack at the ready position until the rear of the rack at the loading station is clear of the front of the rack at the ready position.

8. Apparatus for handling packs of printed signatures, comprising: first and second parallel overhead storage means; emtpy rack return mechanism operatively associated with the first storage means; full rack forwarding mechanism operatively associated with the second storage means; a plurality of storage racks having means to receive and hold packs of signatures in spaced relationship; a loading station beneath one end of both said overhead storage means and extending transversely between them; first rotary arm means for lowering empty racks from the first storage means into a receiving end of the loading station; transfer means for moving empty racks successively endwise through the loading station; loading means for loading packs of signatures seriatim into the successive racks to fill said racks as they are moved endwise; second rotary arm means for raising full racks from a delivery end of the loading station; and drive means operating both said rotary arm means in timed relationship with one another and with the endwise movement of said racks.

9. The apparatus of claim 8, which includes sensing means for detecting the absence of a pack of signatures from the loading means, and means for suspending the endwise movement of the racks through the loading station in the absence of a pack from the loading means.

10. The apparatus of claim 9 in which operation of the drive means is initiated by movement of a rack to a predetermined point at the delivery end of the loading station.

11. The apparatus of claim 10 in which operation of the drive means is suspended until a rack in the loading station is a predetermined distance from the receiving end of the station, to maintain clearance between a rack in said first arms and said rack in the loading station.

12. Apparatus for handling packs of printed signatures, comprising: a loading station having a receiving end and a delivery end; a plurality of storage and transfer racks, each rack having a plurality of sets of pack gripping jaws extending thereacross, the jaws of each set being relatively movable to receive and retain several packs of signatures side by side in spaced relationship; rack delivering apparatus for delivering empty racks successively end to end at the receiving end of the loading station; rack removing apparatus for removing full racks successively from the delivery end of the loading station; transfer means for moving racks endwise from the receiving to the delivery end of the loading station; actuating means for moving the jaws of each set at the loading station to receive and grip a pack of signatures; loading means for delivering packs of signatures seriatim to the pack gripping jaws in the racks as the racks are moved through the loading station; and means for intermittently operating said rack delivering and rack removing apparatus in timed relationship with movement of racks through said station.

13. The apparatus of claim 12 in which each set of pack gripping jaws is normally closed, the actuating means is at the loading station and is provided with means for momentarily opening each of said sets of jaws at a predetermined position in the station, and the loading means includes reciprocating pack clamps to move packs between said jaws when the latter are open, and means for opening said clamps when the jaws have closed on a pack in the clamps.

14. The apparatus of claim 13 in which the jaws grip the upper marginal portion of a pack and the clamps grip an area of the pack below said upper marginal portion.

15. The apparatus of claim 12 which includes overhead empty rack storage and return means, overhead full rack storage and forwarding means, the rack delivering apparatus lowers racks from the storage and return means to the loading station and the rack removing apparatus raises full racks from the loading station and deposits them in the storage and forwarding means.

16. The apparatus of claim 15 which includes an escapement for releasing racks from the return means one at a time to the delivering apparatus.

17. The apparatus of claim 15 in which the storage and forwarding means includes a conveyor to move said full racks, and a reciprocating member moves each rack into position to be moved by the conveyor.

18. Apparatus for handling packs of printed signatures, comprising: a loading station; a plurality of racks each of which is provided with a plurality of sets of pack gripping jaws, the jaws of each set being relatively movable to receive and retain a plurality of packs of signatures in spaced relationship; means for moving a succession of said racks end to end through the loading station; actuating means for moving the jaws of each set at the loading station to receive and grip a pack of signatures; and rack loading means at the loading station for feeding packs of signatures seriatim to the jaws of each rack in the succession of racks.

19. Apparatus for handling packs of printed signatures, comprising: a loading station; a plurality of racks each of which is adapted to receive and retain a plurality of packs of signatures in spaced relationship; overhead storage and return means to move empty racks toward the loading station; means for lowering empty racks from the return means into the loading station; means for moving a succession of said racks end to end through the loading station; rack loading means at the loading station for feeding packs of signatures seriatim to each rack in the succession of racks; overhead storage and forwarding means to move full racks from the loading station; and means for raising full racks from the loading station to the forwarding means.

References Cited by the Examiner

UNITED STATES PATENTS

| | | | |
|---|---|---|---|
| 1,837,605 | 12/1931 | Baker | 214—16.4 X |
| 2,861,672 | 11/1958 | Buhrer | 198—85 |
| 3,032,341 | 5/1962 | Reist | 271—79 |
| 3,068,626 | 12/1962 | Ianuzzi | 53—246 |
| 3,087,721 | 5/1963 | McCain | 198—133 |

MARVIN A. CHAMPION, *Primary Examiner.*